(12) United States Patent
Horii

(10) Patent No.: US 12,276,082 B2
(45) Date of Patent: Apr. 15, 2025

(54) WORKING VEHICLE

(71) Applicant: KUBOTA CORPORATION, Osaka (JP)

(72) Inventor: Hiroshi Horii, Osaka (JP)

(73) Assignee: KUBOTA CORPORATION, Osaka (JP)

(*) Notice: Subject to any disclaimer, the term of this patent is extended or adjusted under 35 U.S.C. 154(b) by 299 days.

(21) Appl. No.: 17/838,376

(22) Filed: Jun. 13, 2022

(65) Prior Publication Data

US 2022/0307222 A1 Sep. 29, 2022

Related U.S. Application Data

(63) Continuation of application No. PCT/JP2020/048528, filed on Dec. 24, 2020.

(30) Foreign Application Priority Data

Dec. 27, 2019 (JP) .................................. 2019-238287
Dec. 27, 2019 (JP) .................................. 2019-238289

(51) Int. Cl.
*E02F 9/08* (2006.01)
*B60K 11/04* (2006.01)
(Continued)

(52) U.S. Cl.
CPC ............ *E02F 9/0866* (2013.01); *B60K 11/04* (2013.01); *E02F 9/0883* (2013.01); *F28F 13/14* (2013.01); *F28D 1/05316* (2013.01)

(58) Field of Classification Search
CPC ........ E02F 9/0866; B60K 11/04; F28F 13/14; F28D 1/05316
See application file for complete search history.

(56) References Cited

U.S. PATENT DOCUMENTS

2010/0172132 A1 7/2010 Ko
2020/0282823 A1* 9/2020 Ikeda ..................... F01P 3/18
(Continued)

FOREIGN PATENT DOCUMENTS

| JP | 50-51033 U1 | 5/1975 |
| JP | 60-78930 U1 | 6/1985 |

(Continued)

OTHER PUBLICATIONS

Notification of Reasons for Rejection dated Jan. 9, 2024 in corresponding Japanese family member Patent Application No. 2019-238287 with English language translation thereof.
(Continued)

*Primary Examiner* — Erez Gurari
(74) *Attorney, Agent, or Firm* — Greenblum & Bernstein, P.L.C.

(57) ABSTRACT

A working machine includes a cooling fan, and a first cooling device and a second cooling device that are disposed in series in a flow passage of cooling air that is generated by the cooling fan. The first cooling device is disposed upstream of the second cooling device in a direction of flow of the cooling air, and has a heat-exchange suppressing portion that is provided at a portion corresponding to a region in a rotation center vicinity of the cooling fan and that suppresses heat exchange between the cooling air and a fluid that flows in the first cooling device.

5 Claims, 16 Drawing Sheets

(51) Int. Cl.
    *F28F 13/14*    (2006.01)
    *F28D 1/053*    (2006.01)

(56) References Cited

U.S. PATENT DOCUMENTS

| | | | | |
|---|---|---|---|---|
| 2022/0105783 | A1* | 4/2022 | Torii | B60N 2/38 |
| 2023/0031731 | A1* | 2/2023 | Ghorpade | F01P 5/02 |
| 2023/0323629 | A1* | 10/2023 | Horii | E02F 9/2264 |

FOREIGN PATENT DOCUMENTS

| | | |
|---|---|---|
| JP | 61-170874 | 10/1986 |
| JP | 11-082023 A | 3/1999 |
| JP | 2000-301956 A | 10/2000 |
| JP | 2005-336731 A | 12/2005 |
| JP | 2008-69756 A | 3/2008 |
| JP | 3150358 U | 4/2009 |
| JP | 2011-116253 A | 6/2011 |
| JP | 2018-58531 A | 4/2018 |
| JP | 2019-18734 A | 2/2019 |
| JP | 2019-157490 A | 9/2019 |
| KR | 10-2013-0004988 | 1/2015 |
| WO | 2015/059890 | 4/2015 |

OTHER PUBLICATIONS

International Search Report and Written Opinion of the International Searching Authority issued in International Patent Application No. PCT/JP/2020/048528, dated Mar. 23, 2021, along with an English translation thereof.

Notification of Reasons for Rejection issued to corresponding Japanese Patent Application No. 2019-238289 dated Sep. 27, 2022, along with English translation thereof.

Office Action issued in Corresponding JP Patent Application No. 2019-238287, dated Jun. 25, 2024, along with an English translation thereof.

Office Action issued in Corresponding CN Patent Application No. 202080081944.X, dated Jan. 24, 2025, along with an English translation thereof.

* cited by examiner

WORKING VEHICLE

CROSS REFERENCE TO RELATED APPLICATIONS

This application is a continuation application of International Application No. PCT/JP 2020/048528, filed on Dec. 24, 2020, which claims the benefit of priority to Japanese Patent Application No. 2019-238287, filed on Dec. 27, 2019, and to Japanese Patent Application No. 2019-238289, filed on Dec. 27, 2019. The entire contents of each of these applications are hereby incorporated herein by reference.

BACKGROUND OF THE INVENTION

1. Field of the Invention

The present invention relates to a working machine.

2. Description of the Related Art

Conventionally, a working machine disclosed in Japanese Unexamined Patent Application Publication No. 2019-18734 and a working machine disclosed in Japanese Unexamined Patent Application Publication No. 2011-116253 have been known.

The working machine disclosed in Japanese Unexamined Patent Application Publication No. 2019-18734 has a first cooling device (oil cooler) and a second cooling device (radiator) that are disposed in series in a flow passage of cooling air that is generated by a cooling fan. The first cooling device is disposed upstream of the second cooling device in a direction of flow of the cooling air.

The working machine disclosed in Japanese Unexamined Patent Application Publication No. 2011-116253 has a working device supported at a front portion of a travel unit rotatably around a swing axis extending in an up-down direction.

SUMMARY OF THE INVENTION

In the working machine disclosed in Japanese Unexamined Patent Application Publication No. 2019-18734, due to heat removed from the first cooling device, the temperature of cooling air that flows in the second cooling device disposed on a downstream side in a direction of flow of the cooling air is increased, and the cooling efficiency of the second cooling device is reduced.

Incidentally, in the working machine, the travel unit is provided with a light for illuminating the vicinity of the travel unit when work is performed during, for example, the night. However, when the light is in a fixed state, in performing digging by rotating the working device around the swing axis, there may be a case in which the light cannot illuminate a digging direction or a case in which a light ray of the light is reflected by the working device and is glaring.

In view of the above-described problems, it is an object of the present invention to increase the cooling efficiency of a cooling device disposed on a downstream side in a direction of flow of cooling air.

It is another object of the present invention to provide a working machine capable of changing the direction of a light.

A working machine according to an aspect of the present invention includes a cooling fan; and a first cooling device and a second cooling device that are disposed in series in a flow passage of cooling air that is generated by the cooling fan. The first cooling device is disposed upstream of the second cooling device in a direction of flow of the cooling air, and has a heat-exchange suppressing portion that is provided at a portion corresponding to a region near a rotation center of the cooling fan and that suppresses heat exchange between the cooling air and a fluid that flows in the first cooling device.

The first cooling device may have a heat-dissipating portion where a fin for heat-dissipation is provided, and a non-heat-dissipating portion where the fin is not provided, and the non-heat-dissipating portion may serve as the heat-exchange suppressing portion.

The first cooling device may have a first tank and a second tank that are disposed in parallel so as to be spaced from each other, and a plurality of tubes that cause the first tank and the second tank to communicate with each other and that are provided so as to be spaced from each other in a longitudinal direction of the first tank and the second tank. The first cooling device may be configured to cause a fluid that is to be cooled to flow into one of the first tank and the second tank and to flow out of the other of the first tank and the second tank. The heat-dissipating portion may include the fin between adjacent ones of the tubes, and the non-heat-dissipating portion may have a cooling-air flow passage where the fin is not provided between adjacent one of the tubes.

The first cooling device may have a first device for fluid-cooling and a second device for fluid-cooling that are disposed so as to be spaced from each other, a first connection tube that connects one end of the first device and one end of the second device to each other, and a second connection tube that connects the other end of the first device and the other end of the second device to each other. The heat-exchange suppressing portion may have an opening portion between the first device and the second device and between the first connection tube and the second connection tube.

The first device may have a pair of first tubular bodies that are disposed so as to be spaced from each other, a plurality of first tubes that cause the first tubular bodies to communicate with each other and that are provided so as to be spaced from each other in a longitudinal direction of the first tubular bodies, and a fin that is provided between adjacent ones of the first tubes. The second device may have a pair of second tubular bodies that are disposed so as to be spaced from each other, a plurality of second tubes that cause the second tubular bodies to communicate with each other and that are provided so as to be spaced from each other in a longitudinal direction of the second tubular bodies, and a fin that is provided between adjacent ones of the second tubes. The first connection tube may cause one of the first tubular bodies and one of the second tubular bodies to communicate with each other, and the second connection tube may cause the other of the first tubular bodies and the other of the second tubular bodies to communicate with each other.

A working machine according to another aspect of the present invention includes a travel unit, a working device supported at a front portion of the travel unit rotatably around a swing axis extending in an up-down direction, a light that illuminates a vicinity of the travel unit, and a light support mechanism that is provided at the travel unit and that supports the light with a direction of the light being changeable around a vertical axis.

The travel unit may have a traveling device, a machine body mounted at the traveling device, and a cabin mounted at the machine body. The light support mechanism may have in the cabin an operation portion that is operated to change a direction of the light.

The light support mechanism may have a movable member that rotates together with the light around the vertical axis, a support member that is fixed to the cabin and that supports the movable member rotatably around the vertical axis and movably in a direction along the vertical axis, and a restriction structural portion that restricts rotation of the movable member with respect to the support member. The restriction structural portion may allow rotation of the movable member with respect to the support member by causing the movable member to move in the direction along the vertical axis.

The light support mechanism may have an urging member that pushes down the movable member. The restriction structural portion may have a first engaging portion provided at the support member, and a second engaging portion that is provided at the movable member and that restricts rotation of the movable member around the vertical axis by engaging with the first engaging portion from above the first engaging portion. The operation portion may be attached to the movable member at a location below the restriction structural portion.

The first engaging portion may have a plurality of grooves disposed around the vertical axis, and the second engaging portion may include an engaging member that, by being selectively fitted to the plurality of grooves, restricts rotation of the movable member with respect to the support member. The support member may have a stopper that restricts rotation of the movable member due to the engaging member coming into contact with the stopper when the movable member rotates with the movable member being pushed up by the support member and the engaging member being disengaged from the groove.

The movable member may have a contact member that restricts upward movement of the movable member by coming into contact with the support member so that the engaging member is not positioned above the stopper when the movable member is pushed up.

An interlock portion that changes the direction of the light by moving in conjunction with the rotation of the working device around the swing axis may be provided.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
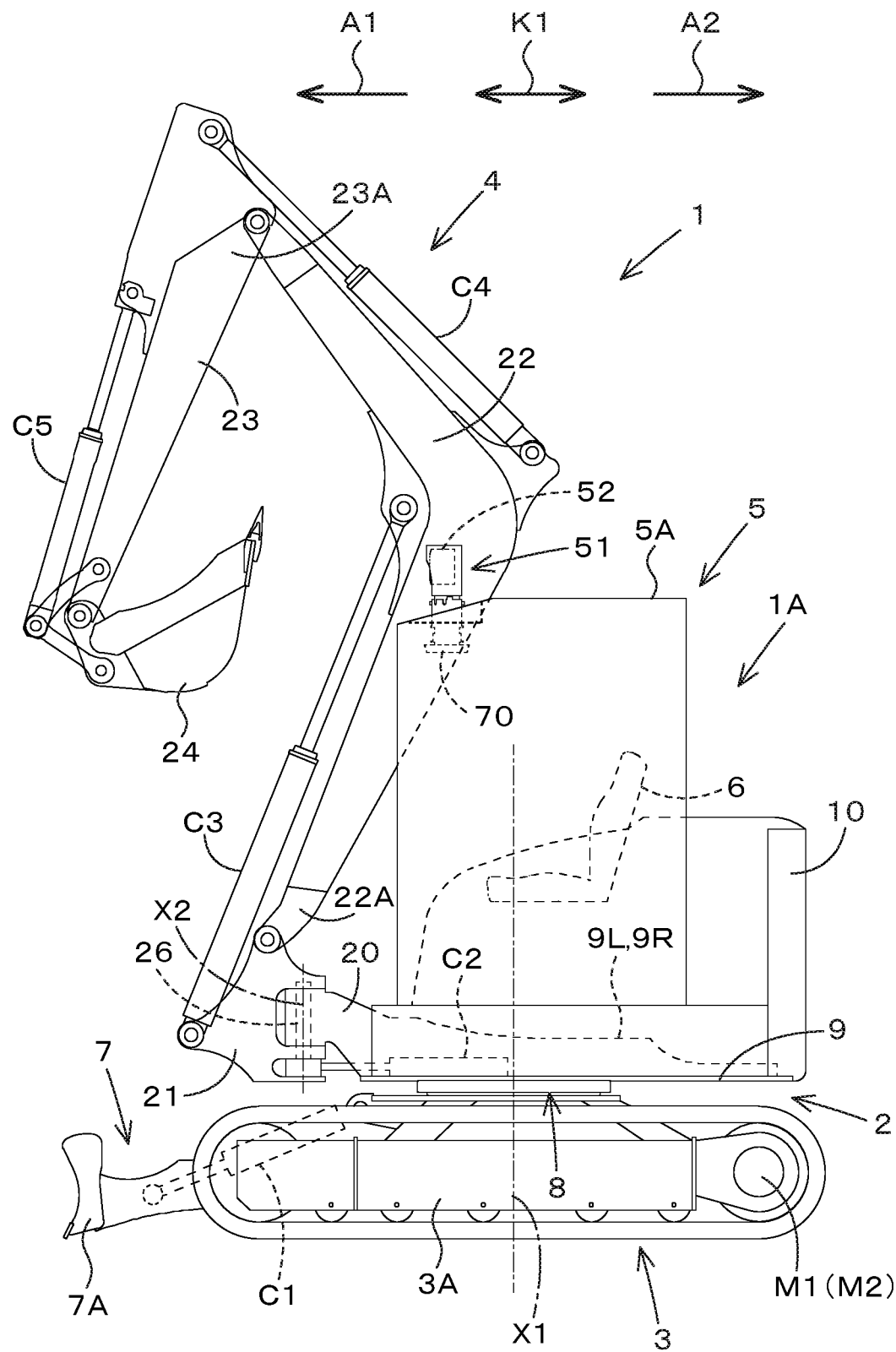
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention is described below with reference to the drawings as appropriate.

Figure 2:
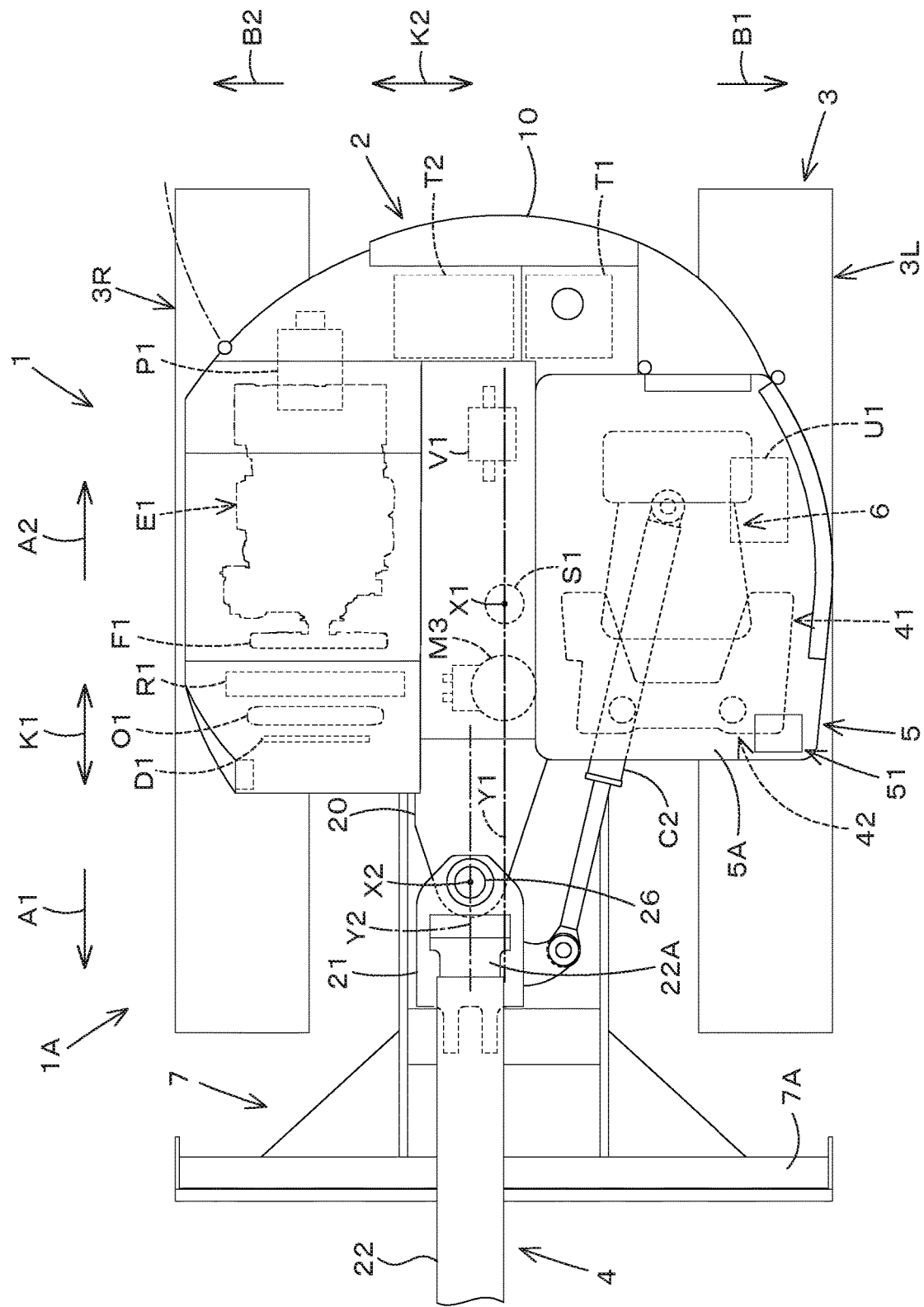
FIG. 2 is a plan view of the working machine.

FIG. 1 is a schematic side view showing an overall structure of a working machine 1 according to the present embodiment. FIG. 2 is a schematic side view of the working machine 1. In the present embodiment, a backhoe, which is a turning working machine, is exemplified as the working machine 1. Note that the working machine is not limited to a backhoe and may be, for example, a tractor, a wheel loader, or a combine.

As shown in FIGS. 1 and 2, the working machine 1 includes a travel unit 1A and a working device 4 mounted on the travel unit 1A. The travel unit 1A has a traveling device 3, a machine body (turning table) 2 mounted on the traveling device 3, and a cabin 5 mounted on the machine body 2.

An operator's seat (seat) 6 on which an operator (driver) is to sit is provided in the cabin 5. The operator's seat 6 is mounted on the machine body 2, and the cabin 5 surrounds the operator's seat 6. That is, the cabin 5 is an operator's seat protection device. As the operator's seat protection device, a canopy may be used.

In the present embodiment, a forward direction corresponds to a forward direction (direction of arrow A1 in FIGS. 1 and 2) of an operator seated on the operator's seat 6 of the working machine 1, a rearward direction corresponds to a rearward direction of the operator (direction of arrow A2 in FIGS. 1 and 2), a leftward direction corresponds to a leftward direction of the operator (direction of arrow B1 in FIG. 1), and a rightward direction corresponds to a rightward direction of the operator (direction of arrow B2 in FIG. 1).

As shown in FIG. 1, a horizontal direction that is a direction orthogonal to a front-rear direction K1 is described as a machine-body width direction K2 (width direction of the machine body 2). A direction toward the right or left from a central portion of the machine body 2 in the width direction is described as a machine-body outer direction (outer direction in the machine-body width direction K2). That is, a machine-body outer direction refers to a direction in the machine-body width direction K2 and is a direction away from the center of the machine body 2 in the width direction. A direction opposite to the machine-body outer direction is described as a machine-body inner direction (inner direction in the machine-body width direction K2). That is, a machine-body inner direction is a direction in the machine-body width direction K2 and is a direction toward the center of the machine body 2 in the width direction.

As shown in FIGS. 1 and 2, the traveling device 3 is a device that supports the machine body 2 so that the machine body 2 is capable of traveling. The traveling device 3 has a traveling frame 3A, a first traveling device 3L on the left of the traveling frame 3A, and a second traveling device 3R on the right of the traveling frame 3A. The first traveling device 3L and the second traveling device 3R are each a crawler traveling device. The first traveling device 3L is driven by a first traveling motor M1. The second traveling device 3R is driven by a second traveling motor M2. The first traveling motor M1 and the second traveling motor M2 are each a hydraulic motor (hydraulic actuator).

A dozer device 7 is mounted on a front portion of the traveling device 3. The dozer device 7 is driven by a dozer cylinder C1. Specifically, the dozer cylinder C1 is a hydraulic cylinder (hydraulic actuator), and a blade 7A of the dozer device 7 is raised and lowered by extension and contraction of the dozer cylinder C1.

As shown in FIG. 1, the machine body 2 is supported on the traveling frame 3A turnably around a turn axis X1 via a turning bearing 8. The turn axis X1 is an axis passing through the center of the turning bearing 8 and extending in an up-down direction.

As shown in FIG. 2, the cabin 5 is mounted on one side portion (left portion) of the machine body 2 in the machine-body-2 width direction K2. The cabin 5 is disposed closer to the one side portion (left portion) in the machine-body width direction K2 than a center line Y1 passing through the turn axis X1 and extending in the front-rear direction K1. The cabin 5 is disposed toward a front portion of the machine body 2.

As shown in FIG. 2, a prime mover E1 is mounted on the other side portion (right portion) of the machine body 2 in the machine-body-2 width direction K2. The prime mover E1 is vertically placed on the machine body 2. "Vertically placed" means "placed with a crank axis of the prime mover E1 extending in the front-rear direction".

The prime mover E1 is disposed closer to the other side portion (right portion) in the machine-body width direction K2 than the center line Y1. The prime mover E1 is a diesel engine. Note that the prime mover E1 may be a gasoline engine, an electric motor, or a hybrid type having an engine and an electric motor.

A hydraulic pump P1 is provided at a rear portion of the prime mover E1. The hydraulic pump P1 is driven by the power of the prime mover E1 and presses and discharges a hydraulic fluid that is used in a hydraulic driving unit. The hydraulic driving unit is, for example, a hydraulic actuator installed at the working machine 1. A radiator R1, an oil cooler O1, and a condenser D1 are disposed forwardly of the prime mover E1 and are mounted on the machine body 2. The radiator R1 is a cooling device (second cooling device) that cools cooling water (fluid) of the prime mover E1, and the oil cooler O1 is a cooling device (first cooling device) that cools a hydraulic fluid (fluid). The condenser D1 is a cooling device (condensing device) that cools a refrigerant (fluid) of an air conditioner mounted on the working machine 1.

A cooling fan F1 that generates cooling air that cools the prime mover E1 is provided between the radiator R1 and the prime mover E1. The cooling fan F1 is driven by the power of the prime mover E1 and generates cooling air that flows rearward from the front.

As shown in FIG. 2, the machine body 2 has a base (hereunder referred to as "turning base") 9 that turns around the turn axis X1. The turning base 9 is formed from, for example, a steel plate, and forms a bottom portion of the machine body 2. The prime mover E1 is mounted on the turning base 9. A vertical rib 9L and a vertical rib 9R, which are reinforcing members, are provided from a front portion to a rear portion on a central side of an upper surface of the turning base 9. The vertical rib 9L is disposed toward one side from the center in the width direction K2 of the machine body 2, and the vertical rib 9R is disposed toward the other side from the center in the width direction K2 of the machine body 2. A turning frame, which serves as a framework of the machine body 2, is formed by providing, in addition to the vertical ribs 9L and 9R, for example, a member that supports objects to be mounted, such as devices to be mounted on the machine body 2. The vicinity of the turning frame in the horizontal direction is covered with a turning cover.

A weight 10 is provided at a rear portion of the machine body 2. The weight 10 is disposed at the rear portion of the machine body 2 and is attached to the turning base 9.

As shown in FIG. 2, a fuel tank T1 and a hydraulic-fluid tank T2 disposed side by side in the machine-body width direction K2 are mounted on the rear portion of the machine body 2. The fuel tank T1 is a tank that stores the fuel of the prime mover E1. The hydraulic-fluid tank T2 is a tank that stores a hydraulic fluid.

As shown in FIG. 2, a turning motor M3 is disposed at a front portion of the turning base 9 (the machine body 2) and at a central portion in the machine-body width direction K2, and the turning base 9 is driven so as to turn around the turn axis X1 by the turning motor M3. The turning motor M3 is a hydraulic motor (hydraulic actuator, hydraulic device). A swivel joint (hydraulic device) S1 is provided at a position on the turn axis X1. The swivel joint S1 is a hydraulic device that causes a hydraulic fluid to circulate, and is a rotary joint that causes a hydraulic fluid to circulate between a hydraulic device of the machine body 2 and a hydraulic device of the traveling device 3. The turning motor M3 is disposed forward of the swivel joint S1. A control valve (hydraulic device) V1 is disposed rearward of the swivel joint S1. The control valve V1 is a sectional-type combined control valve (hydraulic device) having a plurality of control valves superimposed upon and coupled to each other in the up-down direction. A controller U1 is provided below the cabin 5. The controller U1 controls a controlling valve of the control valve V1.

A manipulating device 41 that manipulates the working machine 1 is provided in the cabin 5. The manipulating device 41 is installed forward of the operator's seat 6. The operator's seat 6 and the manipulating device 41 form an operating unit 42.

As shown in FIG. 2, the machine body 2 has a support bracket 20 at a front portion so as to be disposed slightly toward the right at the center in the machine-body width direction K2. The support bracket 20 is fixed to a front portion of the vertical rib 9L and a front portion of the vertical rib 9R, and is provided so as to protrude forward from the machine body 2.

As shown in FIGS. 1 and 2, a swing bracket 21 is attached to a front portion (a portion protruding from the machine body 2) of the support bracket 20 via a swing shaft 26 so as to be swingable around a vertical axis (an axis extending in the up-down direction). Therefore, the swing bracket 21 is rotatable in the machine-body width direction K2 (horizontal direction with the swing shaft 26 as the center).

As shown in FIG. 1, in the forward direction of the turn axis X1 and with a boom 22 (described below) facing the forward direction of the machine body (forward direction), at least a part of the swing bracket 21 is disposed at a position overlapping the center line Y1. The center line Y1 is positioned between a line Y2 in the front-rear direction, which passes through an axis (swing axis) X2 of the swing shaft 26, and a right surface of the cabin 5 (the center line Y1 is disposed at substantially the center).

As shown in FIG. 1, the working device 4 is supported by the swing bracket 21 (the machine body 2) rotatably around the swing axis X2. The working device 4 has the boom 22, an arm 23, and a working tool (bucket) 24. A base portion 22A of the boom 22 is pivotally supported by an upper portion of the swing bracket 21 via a pivot. Specifically, with the boom 22 facing the forward direction of the machine body, the base portion 22A is pivotally connected to the upper portion of the swing bracket 21 so as to be rotatable around a horizontal axis (axis extending in the machine-body width direction K2). Therefore, the boom 22 is swingable in the up-down direction. In a maximally raised position shown in FIG. 1, the boom 22 is bent so that its central portion in a longitudinal direction protrudes rearward.

The arm 23 is pivotally supported on an end of the boom 22 via a pivot. Specifically, with the boom 22 facing the forward direction of the machine body, the arm 23 is pivotally connected to the boom 22 so as to be rotatable around a horizontal axis. Therefore, the arm 23 is swingable in the front-rear direction K1 or the up-down direction. The arm 23 is swingable in a direction toward the boom 22 (crowd direction) and in a direction away from the boom 22 (dump direction).

The working tool 24 is pivotally supported on an end of the arm 23 via a pivot. Specifically, with the boom 22 facing the forward direction of the machine body, the working tool 24 is pivotally connected to the arm 23 so as to be rotatable around a horizontal axis. Therefore, the working tool 24 is swingable in a direction toward the arm 23 (crowd direction) and in a direction away from the arm 23 (dump direction). The bucket, which is the working tool 24, is provided on the arm 23 so as to capable of a shoveling operation and a dumping operation. "Shoveling operation" is an operation that swings the bucket 24 in the direction toward the boom 22, and is, for example, an operation performed when shoveling earth and sand or the like. "Dumping operation" is an operation that swings the bucket 24 in the direction away from the boom 22, and is, for example, an operation performed when causing shoveled earth and sand or the like to fall (to be discharged).

Note that, as the working tool 24, instead of a bucket, a working tool (attachment), such as a pallet fork or a manure fork, or a working tool (hydraulic attachment) having a hydraulic actuator, such as a hydraulic crusher, an angle broom, an earth auger, a snow blower, a sweeper, a mower, or a hydraulic breaker, is attachable.

The swing bracket 21 is swingable due to extension and contraction of a swing cylinder C2 provided in the machine body 2. The boom 22 is swingable due to extension and contraction of a boom cylinder C3. The arm 23 is swingable due to extension and contraction of an arm cylinder C4. The working tool 24 is swingable due to extension and contraction of a working-tool cylinder (bucket cylinder) C5. The swing cylinder C2, the boom cylinder C3, the arm cylinder C4, and the working-tool cylinder C5 are each a hydraulic cylinder (hydraulic actuator).

As shown in FIG. 1, a light device 51 that illuminates the vicinity of the travel unit 1A is provided at the travel unit 1A. Specifically, the light device 51 is provided at an upper front portion of the cabin 5 and illuminates the vicinity of the cabin 5. The light device 51 is provided on a roof 5A of the cabin 5. As shown in FIG. 2, in the present embodiment, the light device 51 is provided on the left side of the roof 5A. Note that the position of the light device 51 is not limited thereto. For example, the light device 51 may be provided on, for example, the right side of the roof 5A, or light devices 51 may be provided on the left and right sides of the roof 5A.

Figure 3:
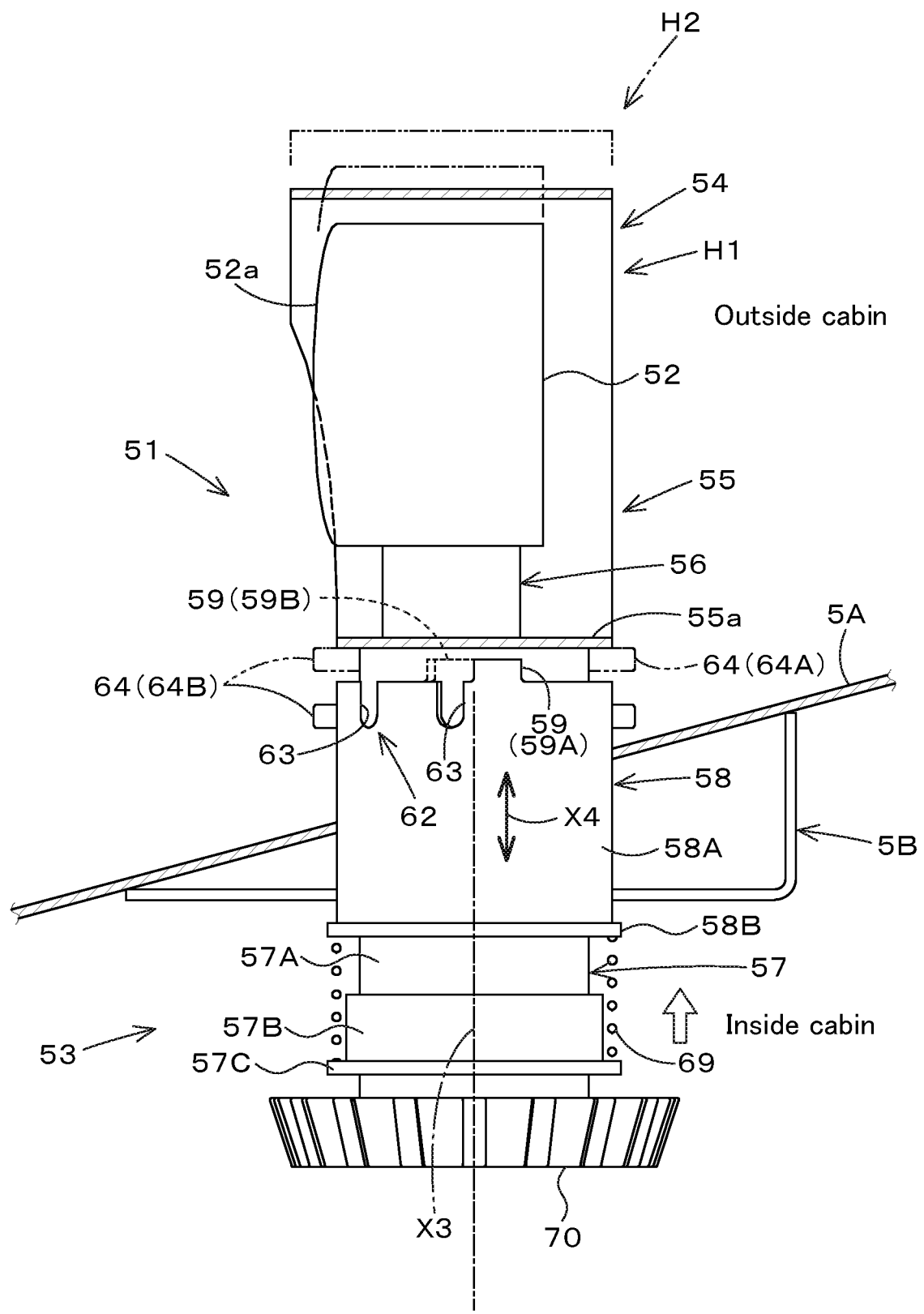
FIG. 3 is a side view of a light device shown partly in section.
Figure 4:
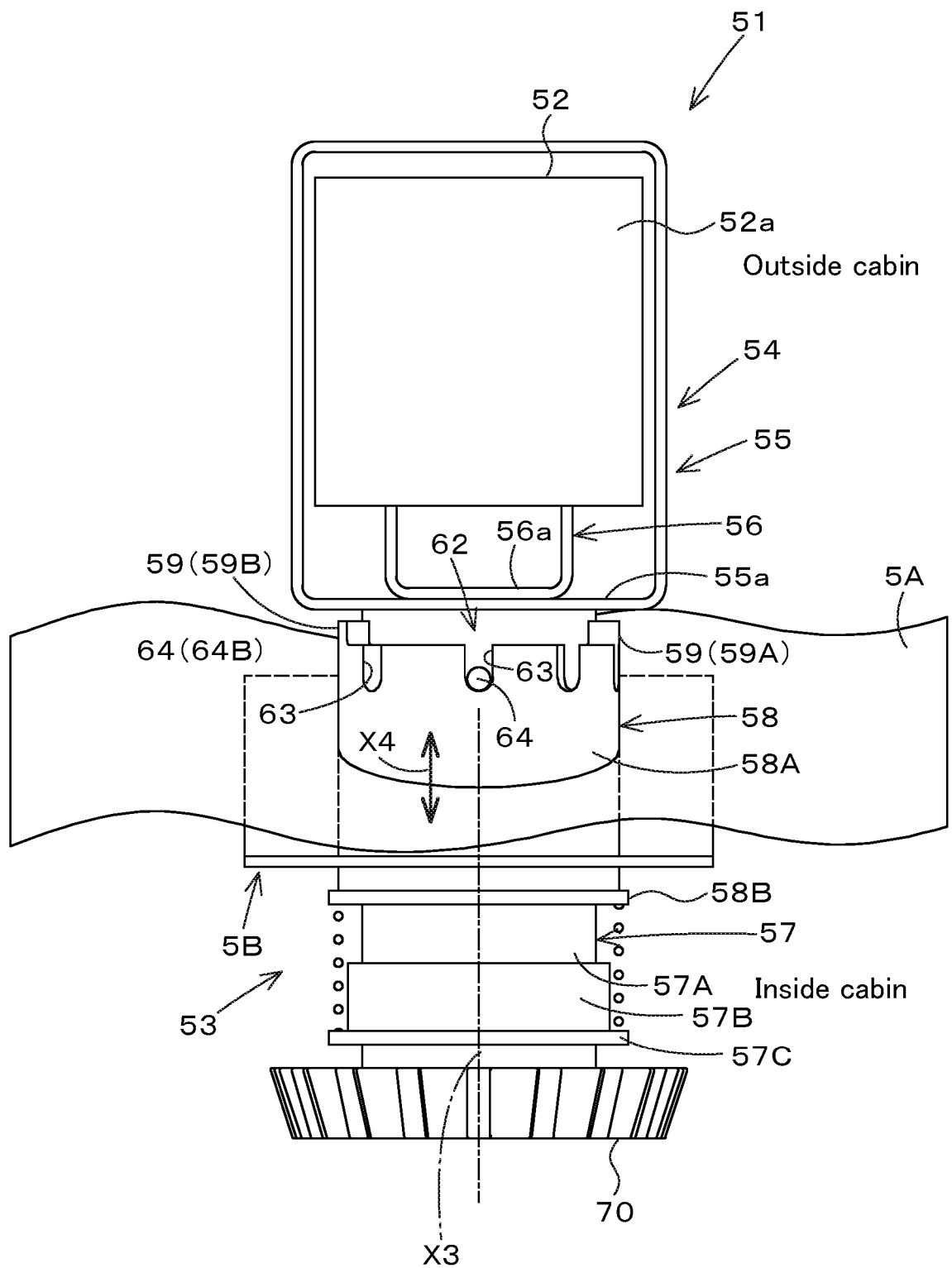
FIG. 4 is a front view of the light device.

As shown in FIGS. 3 and 4, the light device 51 has a light 52 (headlight) that illuminates the vicinity of the travel unit 1A. The light 52 is disposed outside the cabin 5, and has an illumination surface 52a that causes light to illuminate the forward direction. The light 52 is supported by a light support mechanism 53 so that the direction of the light 52 around a vertical axis (called a "rotation axis X3") is changeable.

As shown in FIGS. 3 and 4, the light support mechanism 53 has a light bracket 54 to which the light 52 is attached. The light bracket 54 has a light cover 55 that covers the light 52, and a stay member 56 to which the light 52 is attached. The light cover 55 has a rectangular cylindrical shape that covers the light 52 from above and below the light 52 and from the left and the right of the light 52. The stay member 56 stands on a lower wall 55a of the light cover 55. The light 52 is attached to an upper portion of the stay member 56.

Figure 7:
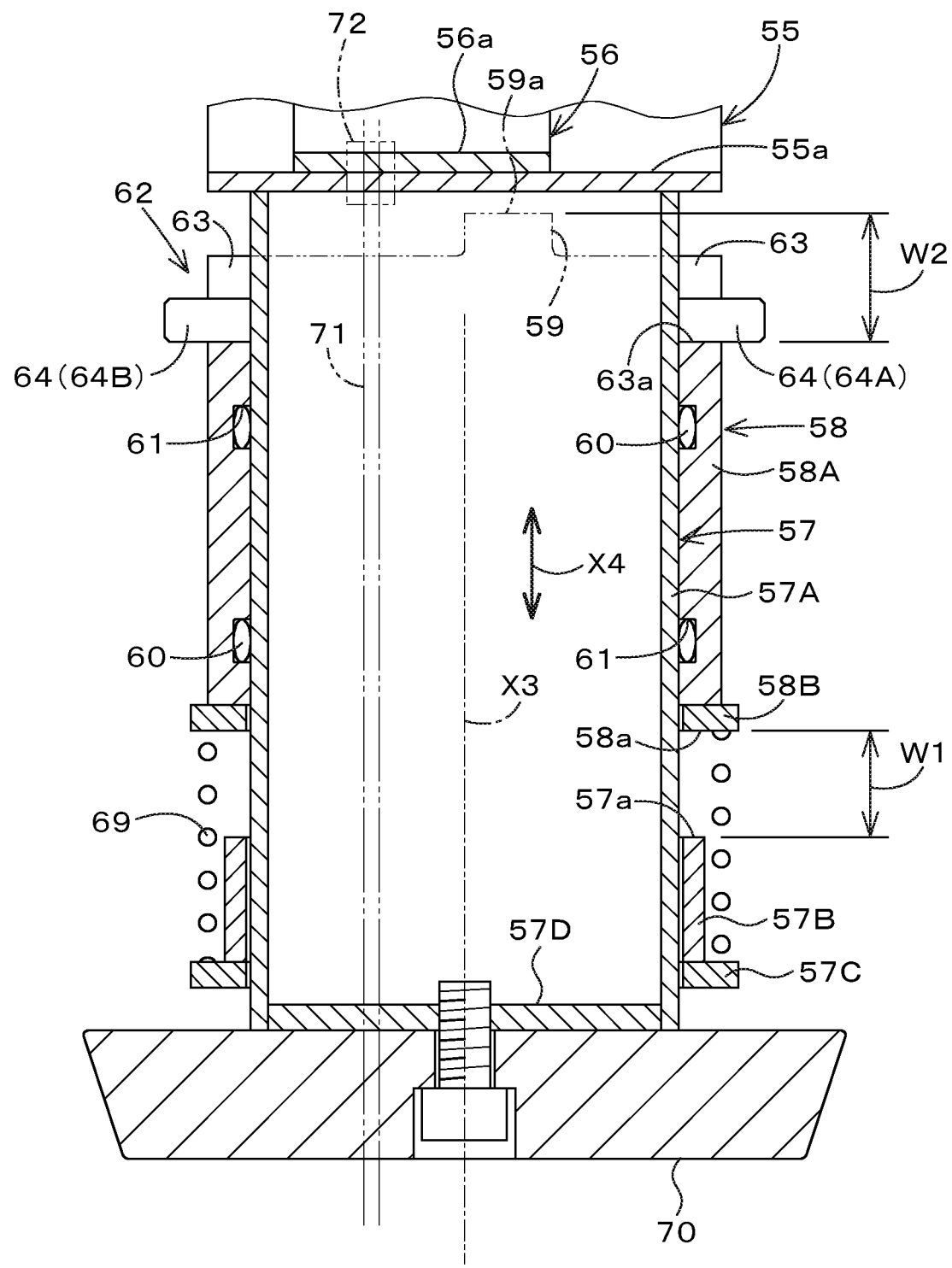
FIG. 7 is a sectional view of the light device.

As shown in FIG. 7, the light support mechanism 53 has a movable member 57 that rotates together with the light 52 around the rotation axis X3. The movable member 57 has a movable body portion 57A, a contact member 57B, and a spring receiving member (second spring receiving member) 57C. The movable body portion 57A has a cylindrical shape around the rotation axis X3, and an upper end of the movable body portion 57A is fixed to the lower wall 55a of the light cover 55. A bottom plate 57D is fixed to a lower portion of an inner portion of the movable body portion 57A. The contact member 57B has a cylindrical shape around the rotation axis X3. Specifically, the contact member 57B has a cylindrical shape having a diameter that is slightly larger than the diameter of the movable body portion 57A. The contact member 57B is fitted to an outer side of the lower portion of the movable body portion 57A, and is fixed to the lower portion of the movable body portion 57A by, for example, a screw. The second spring receiving member 57C has a ring shape, and is fixed to a lower end of the contact member 57B.

As shown in FIGS. 3, 4, and 7, the light support mechanism 53 has a support member 58 that supports the movable member 57 rotatably around the rotation axis X3 and movably in a direction (rotation axis direction) X4 along the rotation axis X3. The support member 58 has a support body portion 58A and a spring receiving member (first spring receiving member) 58B. The support body portion 58A has a cylindrical shape around the rotation axis X3, and is fixed to the roof 5A (the cabin 5). Specifically, the support body portion 58A extends in the up-down direction through the roof 5A and a reinforcing member 5B fixed to a side of the roof 5A that is inside the cabin 5, and is fixed to the roof 5A and the reinforcing member 5B. An upper portion of the support body portion 58A protrudes upward from the roof 5A (toward the outside of the cabin 5), and a lower portion of the support body portion 58A protrudes downward from the reinforcing member 5B (toward the inside of the cabin 5). The first spring receiving member 58B has a ring shape and is fixed to a lower end of the support body portion 58A.

As shown in FIG. 7, the movable body portion 57A is inserted into the support body portion 58A and the first spring receiving member 58B rotatably around the rotation axis X3 and movably in the rotation axis direction X4. A lower portion of the movable body portion 57A protrudes downward (toward the inside of the cabin 5) from the support body portion 58A, and the contact member 57B is disposed below the support body portion 58A.

Figure 5:
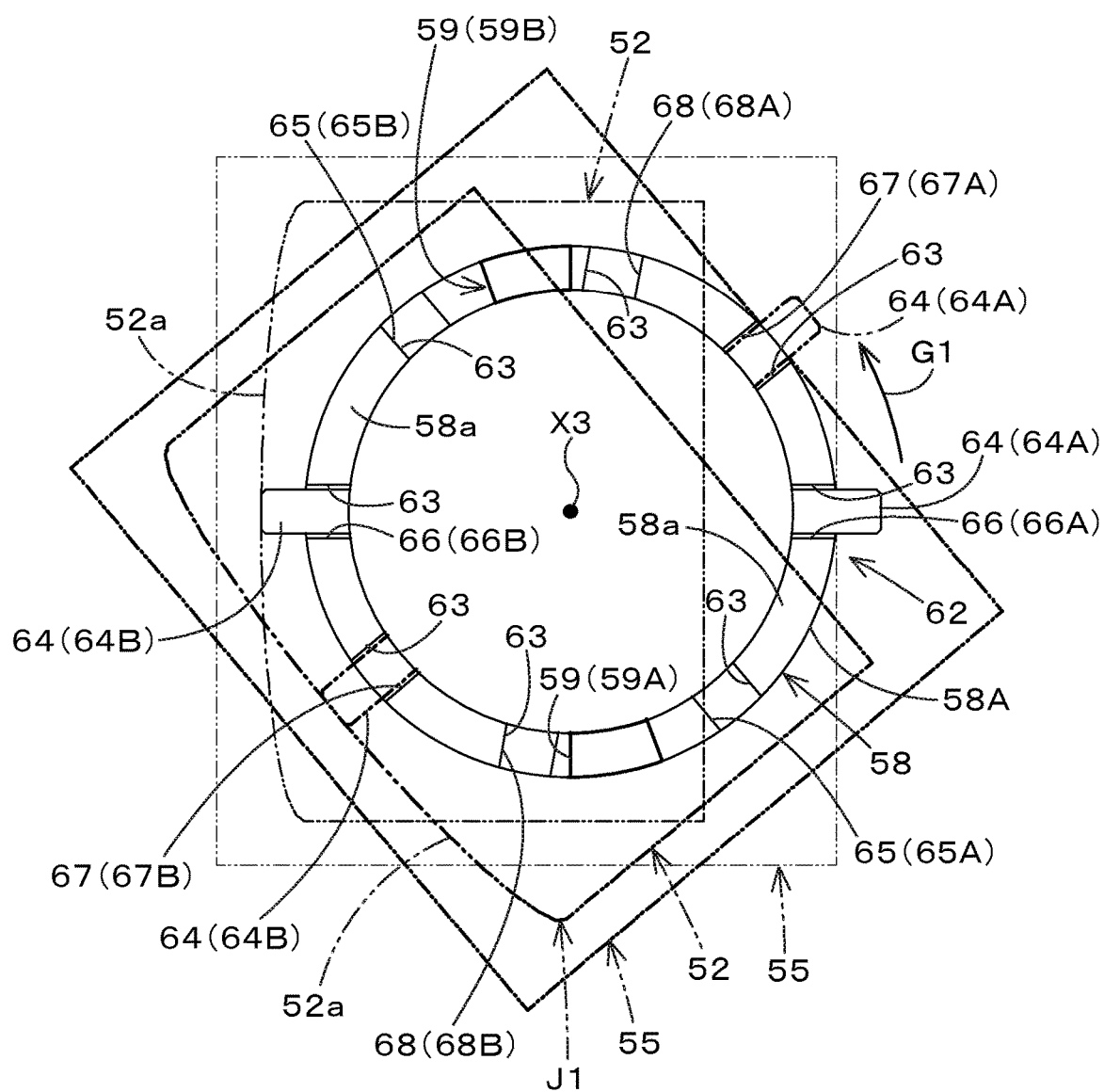
FIG. 5 is a plan view of the light device.

As shown in FIGS. 3 and 4, a plurality (a pair) of stoppers 59 (stopper 59A, stopper 59B) are formed on an upper end of the support body portion 58A. Each stopper 59 protrudes upward from the upper end of the support body portion 58A. As shown in FIG. 5, the pair of stoppers 59 are formed at symmetrical positions in a radial direction of the support body portion 58A (point-symmetrical positions around the rotation axis X3). Note that the number of stoppers 59 may be one.

As shown in FIG. 7, spaces between an outer periphery of the movable body portion 57A and an inner periphery of the support body portion 58A are sealed by a plurality of seal members (0 rings) 60. The seal members 60 are disposed at an upper portion and a lower portion of the inner periphery of the support body portion 58A, and are fitted to peripheral grooves 61 formed in a peripheral direction in an inner peripheral surface of the support body portion 58A.

As shown in FIGS. 3, 4, 5, and 7, the light support mechanism 53 has a restriction structural portion 62 that restricts rotation of the movable member 57 with respect to the support member 58. The restriction structural portion 62 has a plurality of grooves (first engaging portions) 63 provided in the support body portion 58A (the movable member 57), and a plurality of pins 64 (second engaging portions, engaging members) provided on the movable body portion 57A (the movable member 57).

As shown in FIG. 5, the plurality of grooves 63 include at least one first engaging groove 65, at least one second engaging groove 66, at least one third engaging groove 67, and at least one fourth engaging groove 68, which are formed around the rotation axis X3 at the upper end of the support body portion 58A. The at least one first engaging groove 65 to the at least fourth engaging groove 68 are each a pair of engaging grooves, and the pair of first engaging grooves 65A and 65B, the pair of second engaging grooves 66A and 66B, the pair of third engaging grooves 67A and 67B, and the pair of fourth engaging grooves 68A and 68B are such that the grooves of each pair are formed at symmetrical positions in the radial direction of the support body portion 58A. The first engaging grooves 65 to the fourth engaging grooves 68 are formed between the stopper 59A and the stopper 59B. The first engaging grooves 65 to the fourth engaging grooves 68 are each a groove formed to face downward from the upper end of the support body portion 58A and formed as a through hole in the radial direction of the support body portion 58A.

Rotation of the movable member 57 around the rotation axis X3 is restricted due to the pins (the second engaging portions) 64 engaging with the grooves (the first engaging portions) 63 from above the grooves 63. Specifically, the rotation of the movable body portion 57A (the movable member 57) with respect to the support body portion 58A (the support member 58) is restricted due to selectively fitting the pins 64 to the plurality of grooves 63. The pins 64 are provided in a pair, and the pair of pins 64 (a first pin 64A and a second pin 64B) are fixed at symmetrical positions in the radial direction at an upper portion of the movable body portion 57A. The first pin 64A and the second pin 64B are fixed to the movable body portion 57A so as to protrude outward in the radial direction.

As shown in FIG. 5, with the light 52 facing the forward direction of the cabin 5, the first pin 64A is fitted to the second engaging groove 66A, and the second pin 64B is fitted to the second engaging groove 66B. Rotation of the movable body portion 57A with respect to the support body portion 58A and downward movement of the movable body portion 57A with respect to the support body portion 58A are restricted due to the first pin 64A being fitted to the second engaging groove 66A and the second pin 64B being fitted to the second engaging groove 66B. When, from this state, the movable body portion 57A is moved upward, the pins 64 also move upward as the movable body portion 57A moves upward, and disengage upward from the second engaging grooves 66. When the pins 64 disengage from the second engaging grooves 66, the rotation of the movable body portion 57A with respect to the support body portion 58A is allowed. In this state, when the movable body portion 57A is rotated in the direction of arrow G1 shown in FIG. 5, and the first pin 64A is fitted to the third engaging groove 67A and the second pin 64B is fitted to the third engaging groove 67B, the direction (illumination direction) of the light 52 is changed as indicated by an alternate long and two short dash line J1 in FIG. 5. Similarly, it is possible to change the direction of the light 52 to other directions by refitting the pins 64 to other grooves 63.

As described above, the positions of the light 52, the light bracket 54, and the movable body portion 57A are each changeable to a rotation restriction position H1 (position indicated by a solid line in FIG. 3), where the pins (the second engaging portions) 64 engage with corresponding ones of the grooves (the first engaging portions) 63, and to a rotation allowing position H2 (position indicated by an alternate long and two short dash line in FIG. 3), where the pins (the second engaging portions) 64 are disengaged from the grooves (the first engaging portions) 63. When, at the rotation allowing position H2, the movable body portion 57A is rotated and the second engaging portions 64 come into contact with the stoppers 59, the rotation of the movable body portion 57A with respect to the support body portion 58A is restricted. Therefore, even if the light 52 and the light bracket 54 cannot be seen from the inside of the cabin 5 (the operator's seat 6), an operator can know that the light 52 is at an end portion of a rotation range.

As shown in FIG. 7, the light support mechanism 53 has an urging member 69 that pushes down the movable member 57. The urging member 69 includes a coil spring, and is disposed outward of the movable body portion 57A between the first spring receiving member 58B and the second spring receiving member 57C. The urging member 69 is interposed in a compressed state between the first spring receiving member 58B and the second spring receiving member 57C, and urges the movable body portion 57A downward with respect to the support body portion 58A. Therefore, the second engaging portions 64 are prevented from being accidentally disengaged from corresponding ones of the first engaging portions 63.

As shown in FIG. 7, a distance W1 between a lower end 58a of the first spring receiving member 58B and an upper end 57a of the contact member 57B is smaller than a distance W2 between a bottom end 63a of each groove 63 and an upper end 59a of each stopper 59. Upward movement of the movable body portion 57A is restricted due to the upper end 57a of the contact member 57B coming into contact with the lower end 58a of the first spring receiving member 58B when the movable body portion 57A has been moved upward. Therefore, it is possible to prevent the pins 64 from being positioned above the stoppers 59 when the movable body portion 57A has been pushed upward.

As shown in FIGS. 3 and 4, the light support mechanism 53 has an operation portion 70 for changing the direction of the light 52. The operation portion 70 is attached to the movable body portion 57A. Specifically, the operation portion 70 is disposed below the movable body portion 57A, and is fixed to the bottom plate 57D by, for example, a bolt (see FIG. 7). Therefore, the operation portion 70 is disposed in the cabin 5. Consequently, an operator is capable of manually changing the direction of the light 52 from the inside of the cabin 5. That is, the operator is capable of changing the illumination direction of the light 52 without getting out of the cabin 5.

Although, in the embodiment above, the direction of the light 52 can be changed in four steps, the number of steps is not limited thereto. The direction of the light 52 may be changeable in two steps, three steps, or five or more steps.

Figure 6:
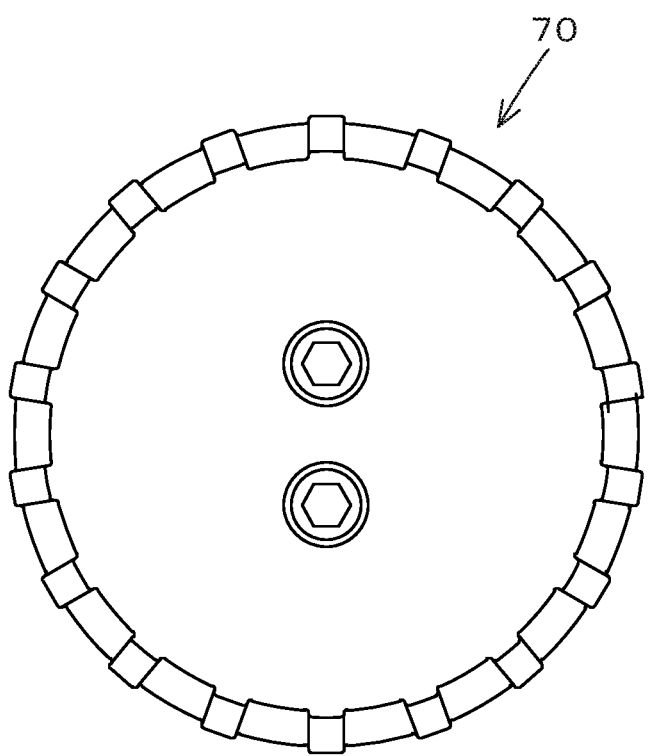
FIG. 6 is a bottom view of an operation portion.

As shown in FIG. 7, the operation portion 70 has a disc shape and tapers so that its diameter gradually decreases in a downward direction. As shown in FIG. 6, an outer peripheral portion of the operation portion 70 has an uneven shape in which protrusions and recesses are alternately disposed side by side in a peripheral direction.

In the present embodiment, since the movable body portion 57A has a cylindrical shape, as shown in FIG. 7, a harness 71 for supplying electricity to the light 52 can be passed through the movable body portion 57A. The harness 71 is inserted into the movable body portion 57A by being passed through a lower wall 56a of the stay member 56 and the lower wall 55a of the light cover 55 from the light 52. A water-proofing grommet 72 is provided at the lower wall 56a and the lower wall 55a. The harness 71 is routed inside the cabin 5 by being inserted from the inside of the movable body portion 57A to the bottom plate 57D and the operation portion 70.

Figure 8:
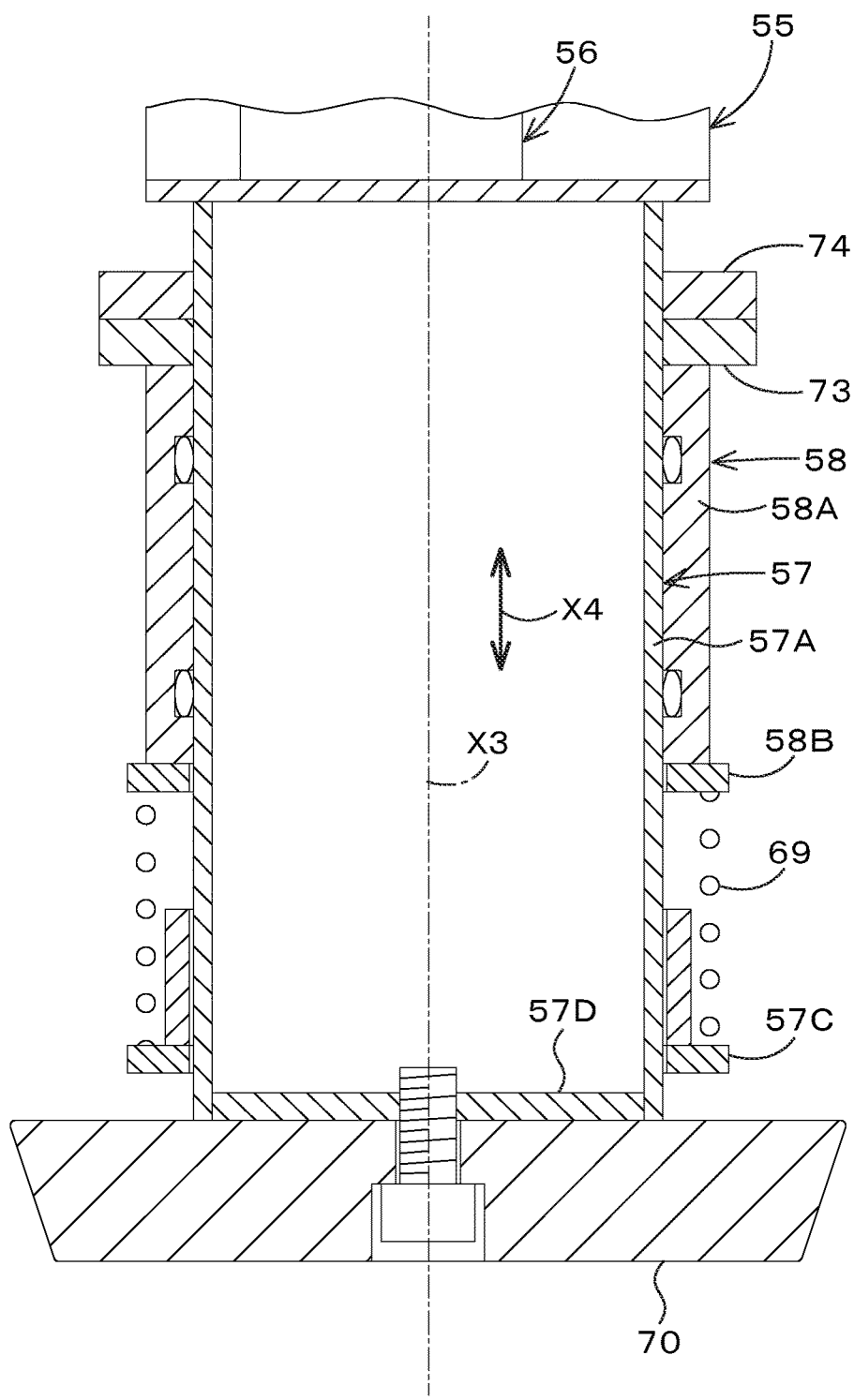
FIG. 8 is a sectional view of a light device according to another embodiment.
Figure 9:
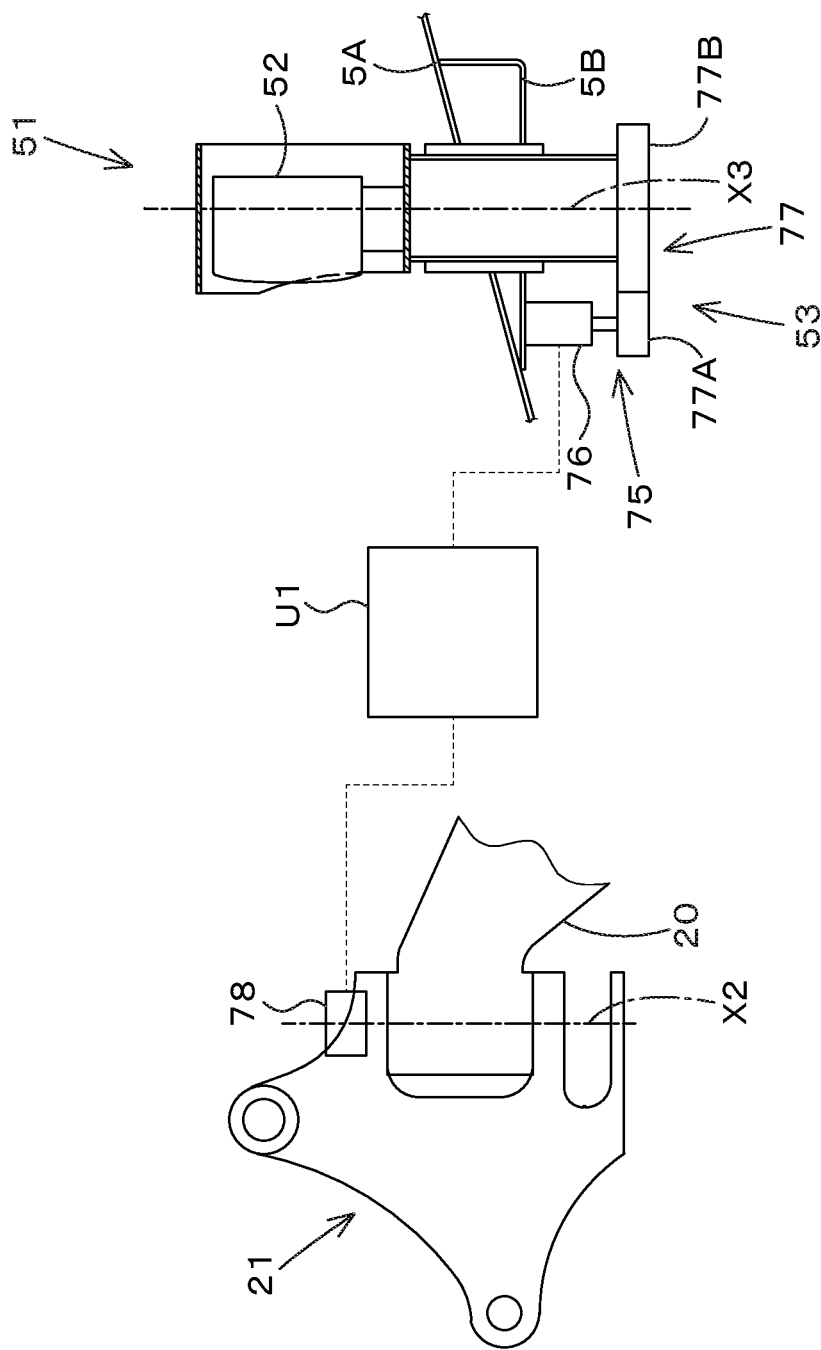
FIG. 9 is a structural view of a light device according to another embodiment.
Figure 10:
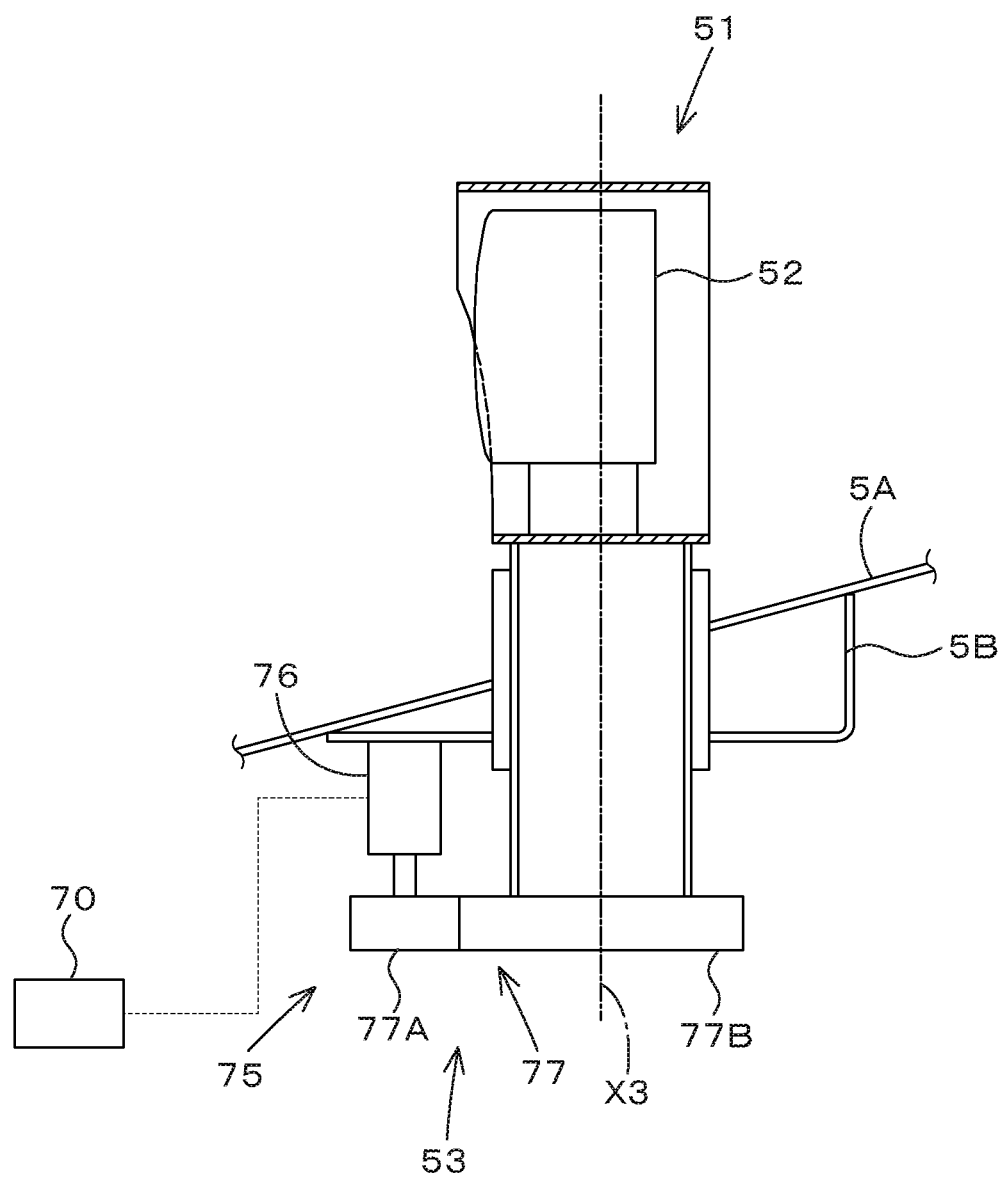
FIG. 10 is a structural view of a light device according to another embodiment.

FIGS. 8, 9, and 10 each show a light device 51 according to a different embodiment.

The embodiment shown in FIG. 8 differs in the structure of a restriction structural portion 62.

As shown in FIG. 8, the restriction structural portion 62 has a first friction plate (first engaging portion) 73 that is provided at the support body portion 58A, and a second friction plate (second engaging portion) 74 that is provided at the movable body portion 57A. The first friction plate 73 has a ring shape and is fixed to an upper end of the support body portion 58A. The movable body portion 57A has the first friction plate 73 inserted therein, and is rotatable around the rotation axis X3 and is movable in the rotation axis direction X4 with respect to the first friction plate 73. The second friction plate 74 has a ring shape, and is disposed above the first friction plate 73 so as to oppose the first friction plate 73. The second friction plate 74 is fixed to the outer side of the movable body portion 57A.

In the embodiment above, due to the movable body portion 57A being lowered by an urging force of the urging member 69 and the second friction plate 74 being pushed against the first friction plate 73, friction that is produced at a contact surface between the first friction plate 73 and the second friction plate 74 restricts rotation of the movable body portion 57A with respect to the support body portion 58A. Due to the movable body portion 57A being pushed upward and the second friction plate 74 being separated from the first friction plate 73, the friction is eliminated and the rotation of the movable body portion 57A with respect to the support body portion 58A is allowed. In this embodiment, it is possible to steplessly change the direction of the light 52.

The other structures are the same as those of the embodiment shown in FIGS. 3 to 7.

Note that the structure of the restriction structural portion 62 may be a detent structure. That is, the detent structure has an engaging member (ball) that is provided at one of the support body portion 58A and the movable body portion 57A, an engaging recessed portion that is provided at the other of the support body portion 58A and the movable body portion 57A and with which the engaging member engageably and disengageably engages (fits), and a spring member that urges the engaging member in a direction of engagement with the engaging recessed portion. In the detent structure, due to the engaging member engaging with the engaging recessed portion, rotation of the movable body portion 57A around the rotation axis X3 and movement of the movable body portion 57A in the rotation axis direction X4 with respect to the support body portion 58A are restricted. By forcefully moving the movable body portion 57A in the rotation axis direction X4 with respect to the support body portion 58A, the engaging member disengages from the engaging recessed portion and thus the rotation of the movable body portion 57A around the rotation axis X3 with respect to the support body portion 58A is allowed. In this case, of the engaging member and the engaging recessed portion, that which is provided at the support body portion 58A is the first engaging portion and that which is provided at the movable body portion 57A is the second engaging portion.

The embodiment shown in FIG. 9 differs in that, instead of manually changing the direction of the light 52, the direction of the light 52 is automatically changed in conjunction with the rotation of the working device 4 around the swing axis X2. In this embodiment, the light support mechanism 53 has a drive mechanism 75 that rotates the movable body portion 57A around the rotation axis X3, and the drive mechanism 75 causes and restricts the rotation of the movable body portion 57A with respect to the support body portion 58A. Therefore, in this embodiment, a restriction structural portion 62 is not provided. The drive mechanism 75 has a motor 76 and a gear mechanism 77. The motor 76 is, for example, an electric motor and is attached to the cabin 5. The gear mechanism 77 has a first gear 77A that is attached to an output shaft of the motor 76 and a second gear 77B that engages with the first gear 77A and that is attached to the movable body portion 57A.

In the embodiment shown in FIG. 9, an interlock portion 79 that causes rotation of the swing bracket 21 around the swing axis X2 and rotation of the movable body portion 57A to be in conjunction with each other is provided. The interlock portion 79 has a controller U1 and a swing detection sensor 78. The motor 76 is connected to the controller U1 and is controlled by the controller U1. The swing detection sensor 78 includes, for example, a potentiometer and detects a rotation angle of the swing bracket 21 around the swing axis X2. The swing detection sensor 78 is connected to the controller U1. The controller U1 is capable of obtaining detection information of the swing detection sensor 78.

In this embodiment, when the swing bracket 21 rotates around the swing axis X2, the controller U1 drives the motor 76 based on the detection information of the swing detection sensor 78 to rotate the movable body portion 57A and to change the direction of the light 52 in accordance with the rotation angle of the swing bracket 21 and in the direction in which the swing bracket 21 has been rotated.

The other structures are the same as those of the embodiment shown in FIGS. 3 to 7.

The embodiment shown in FIG. 10 differs from the embodiment shown in FIG. 9 in that a motor 76 is operated by an operator by using an operation portion 70 including a switch. The operation portion 70 is disposed at an operating unit 42 (for example, a manipulating device 41) inside the cabin 5.

The other structures are the same as those of the embodiment shown in FIG. 9.

Figure 11:
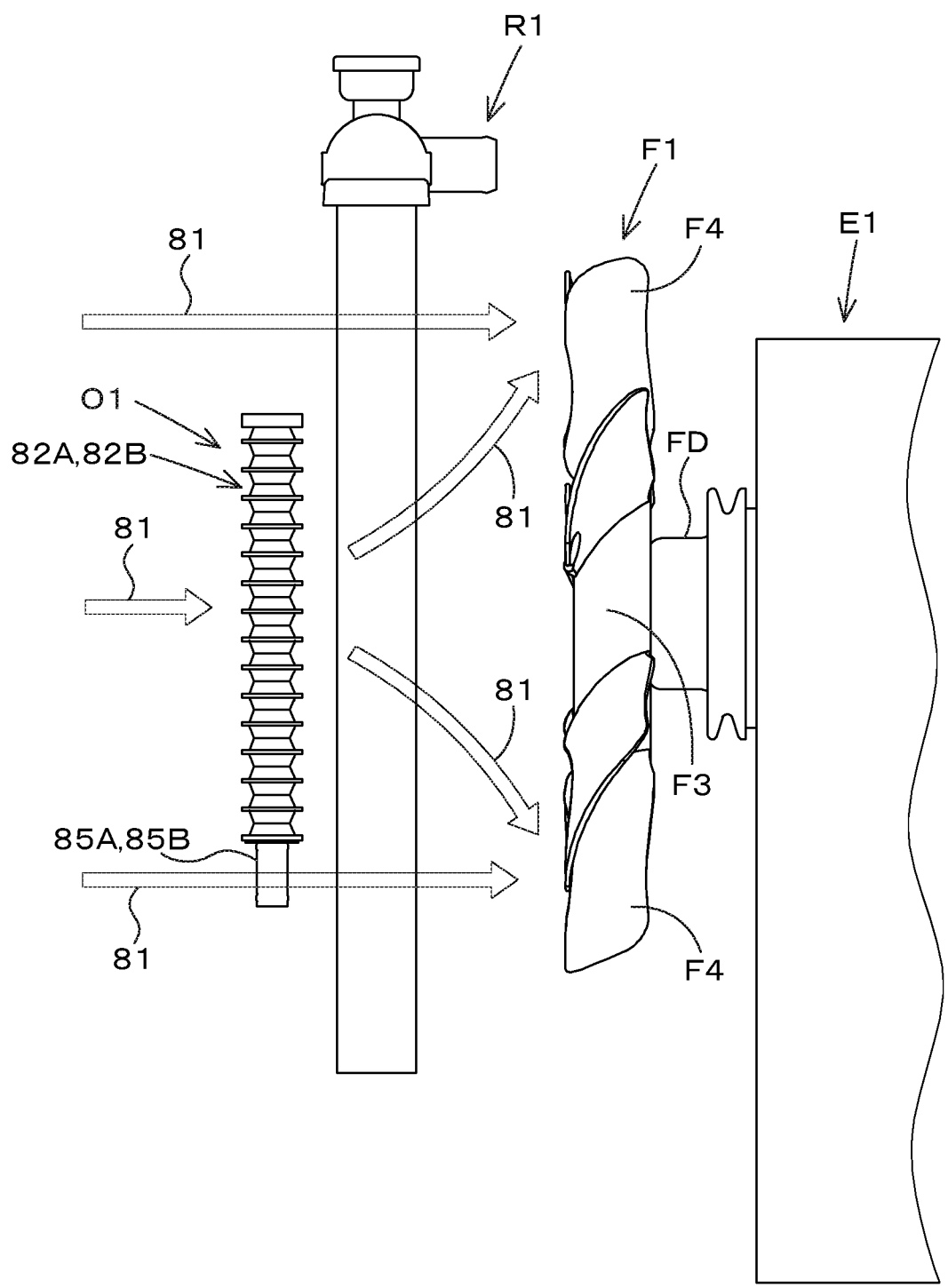
FIG. 11 is a side view of an oil cooler, a radiator, and a cooling fan.
Figure 12:
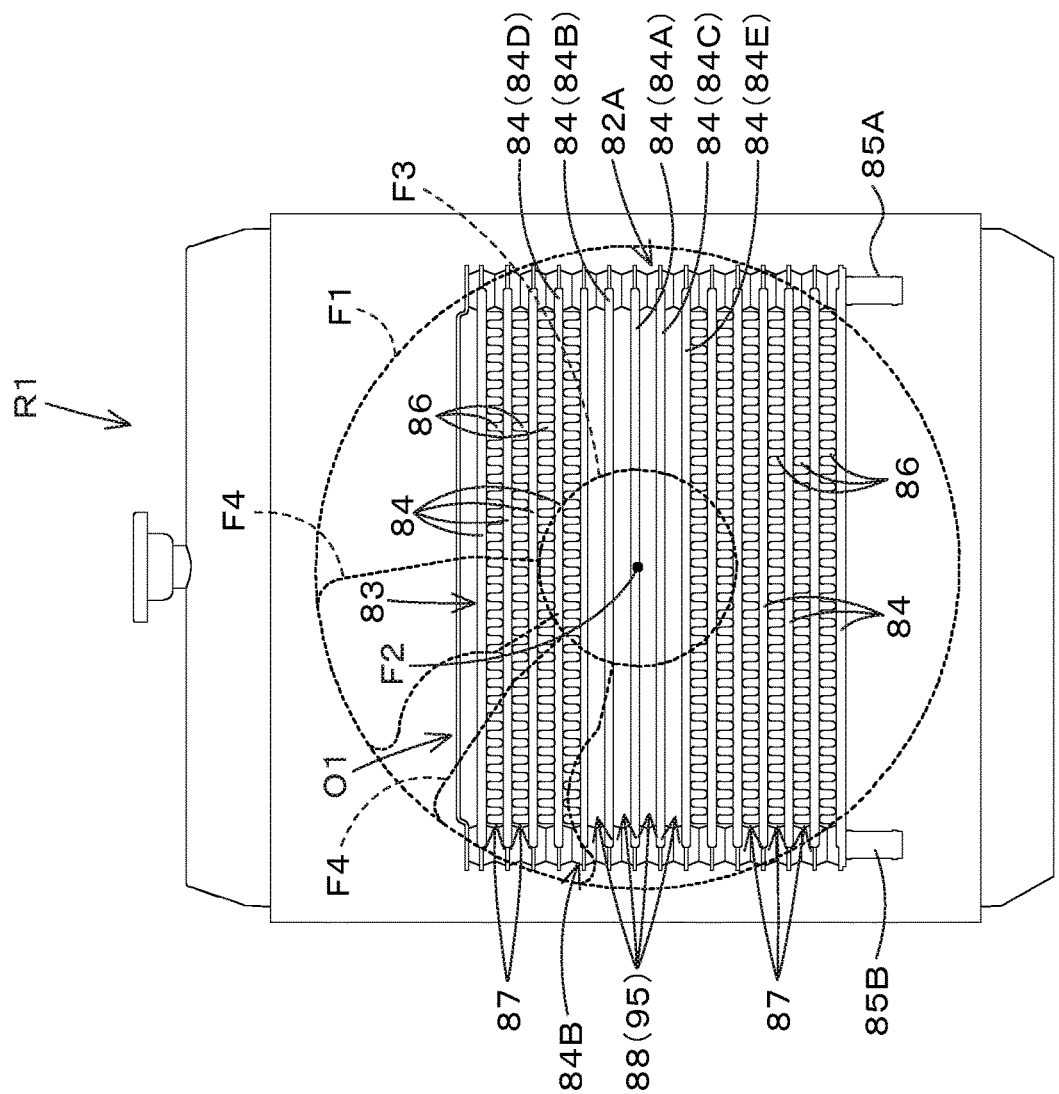
FIG. 12 is a front view of the oil cooler, the radiator, and the cooling fan.

As shown in FIGS. 11 and 12, the oil cooler O1 and the radiator R1 are disposed in series in a flow passage of cooling air 81 that is generated by the cooling fan F1. The oil cooler O1 is disposed upstream of the radiator R1 in a direction of flow of the cooling air 81. In the present embodiment, the oil cooler O1 and the radiator R1 are disposed in series in the front-rear direction K1, and the oil cooler O1 is disposed in front of the radiator R1. The cooling fan F1 has a central portion F3 that is attached to a fan drive shaft FD driven by the power of the prime mover E1, and a plurality of blades (for example, seven blades) F4 whose base portions are fixed to an outer periphery of the central portion F3. The plurality of blades F4 are provided over the entire outer periphery of the central portion F3 so as to be spaced from each other in a peripheral direction.

Figure 13:
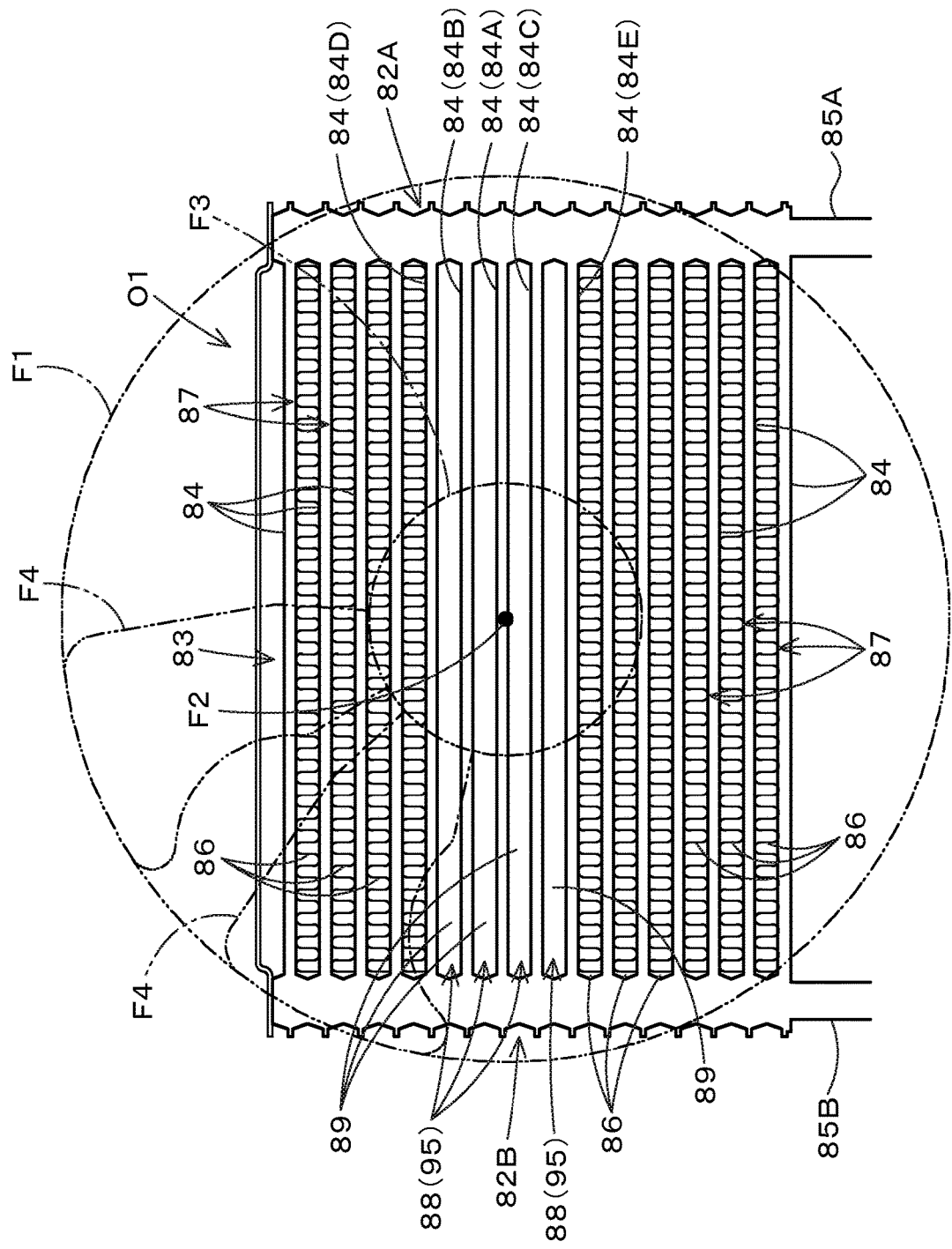
FIG. 13 is a front sectional view of the oil cooler.

As shown in FIG. 13, the oil cooler O1 has a first tank 82A and a second tank 82B that are disposed in parallel so as to be spaced from each other, and a core 83 that is provided between the first tank 82A and the second tank 82B. The cooling air 81 passes through the core 83 and flows into the radiator R1. In the present embodiment, the first tank 82A is disposed on a machine-body left side of the second tank 82B (disposed on the right as seen from a forward direction of the machine body as shown in FIG. 13) so as to be spaced from the second tank 82B. Note that the first tank 82A may be disposed on a machine-body right side of the second tank 82B. The first tank 82A may be disposed above or below the second tank 82B so as to be spaced from the second tank 82B, or may be disposed forward or rearward of the second tank 82B so as to be spaced from the second tank 82B.

As shown in FIG. 13, the first tank 82A and the second tank 82B each have a hollow tubular form that is long in the up-down direction and each have a flow passage therein in which a fluid flows. The core 83 has a plurality of tubes 84. Between the first tank 82A and the second tank 82B, the plurality of tubes 84 are disposed side by side in a longitudinal direction (up-down direction) of the first tank 82A and the second tank 82B so as to be spaced from each other. Each tube 84 has a hollow tubular form that is flat in the up-down direction, and has a flow passage therein in which a fluid flows. Each tube 84 connects the first tank 82A and the second tank 82B to each other and causes the inside of the first tank 82A and the inside of the second tank 82B to communicate with each other.

A hydraulic fluid, which is a fluid to be cooled, flows into one of the first tank 82A and the second tank 82B and flows out of the other of the first tank 82A and the second tank 82B. In the present embodiment, tubular portions 85A and 85B into which and out of which the hydraulic fluid flows are each provided at a lower end portion of a corresponding one of the first tank 82A and the second tank 82B.

As shown in FIG. 13, the core 83 has fins 86 for heat-dissipation that dissipate the heat of a fluid that flows in each tube 84. Each fin 86 is provided between adjacent ones of the tubes 84, and is in contact with or is connected to the tubes 84. The oil cooler O1 (the core 83) has heat-dissipating portions 87 where the fins 86 are provided, and non-heat-dissipating portions 88 where the fins 86 are not provided. The heat-dissipating portions 87 are each provided at a corresponding one of an upper portion and a lower portion of the oil cooler O1. The non-heat-dissipating portions 88 are provided at an intermediate portion between the upper portion and the lower portion of the oil cooler O1. A central portion of the oil cooler O1 is disposed in correspondence with the central portion of the cooling fan F1. That is, the non-heat-dissipating portions 88 are provided at portions corresponding to regions near a rotation center F2 of the cooling fan F1. Specifically, the non-heat-dissipating portions 88 have cooling-air circulation passages 89, where the fins 86 are not provided, between a tube 84A (disposed at a position corresponding to the position of the rotation center F2 of the cooling fan F1) and a tube 84B (disposed adjacently to the tube 84A), between the tube 84A and a tube 84C, between the tube 84B and a tube 84D (disposed adjacently above the tube 84B), and between the tube 84C and a tube 84E (disposed adjacently below the tube 84C). It is possible to suppress an increase in temperature of the cooling air 81 that passes through the oil cooler O1 by forming portions without fins 86 in the oil cooler O1, that is, by providing spaces where heat exchange is not performed in the oil cooler O1. In other words, the non-heat-dissipating portions 88 serve as heat-exchange suppressing portions 95 that suppress heat exchange between the cooling air 81 and a hydraulic fluid (fluid) that flows in the oil cooler O1. By providing the non-heat-dissipating portions 88, it is possible to increase the cooling efficiency of the radiator R1 disposed downstream of the oil cooler O1 in the direction of flow of the cooling air 81.

Figure 14:
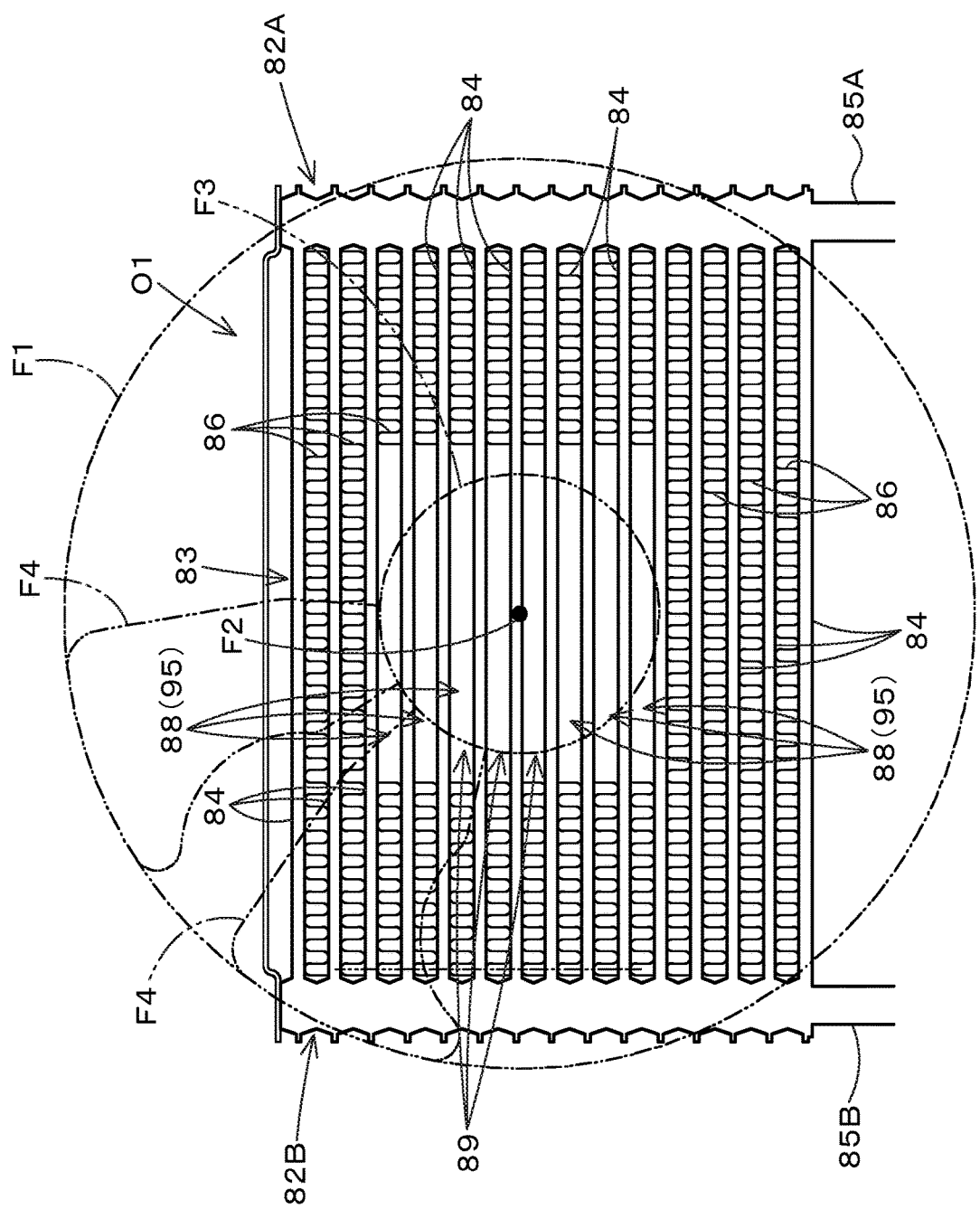
FIG. 14 is a front sectional view of a modification of the oil cooler.
Figure 15:
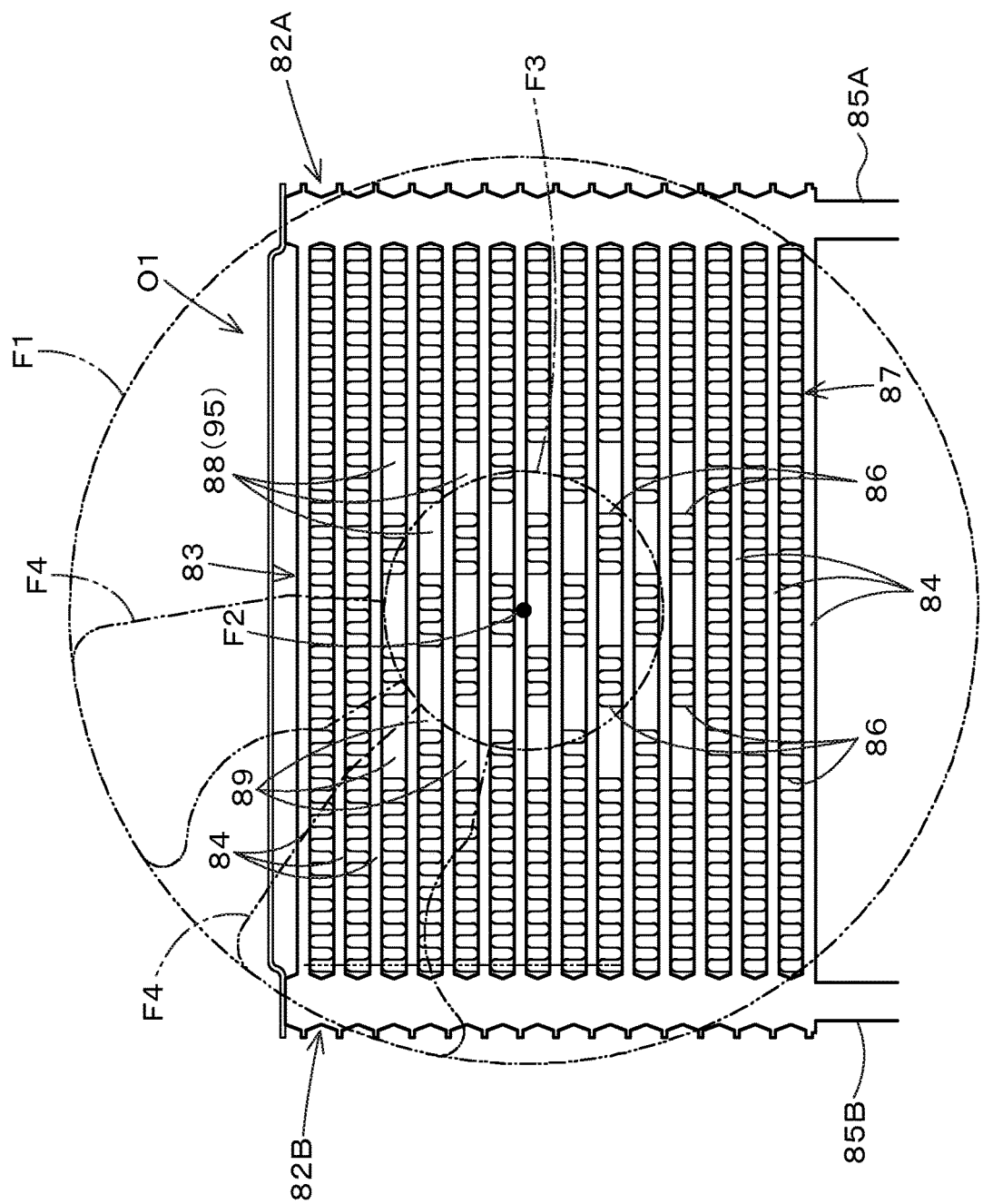
FIG. 15 is a front sectional view of a modification of the oil cooler.

It is possible to variously change the design of the oil cooler O1 above. For example, although, in the present embodiment, four non-heat-dissipating portions 88 are provided, one or more non-heat-dissipating portions 88 may be provided. As shown in FIG. 14, the non-heat-dissipating portions 88 may be provided only at portions corresponding to regions near the rotation center F2 of the cooling fan F1. Alternatively, as shown in FIG. 15, the non-heat-dissipating portions 88 may be intermittently provided in a width direction K3 of the oil cooler O1.

Figure 16:
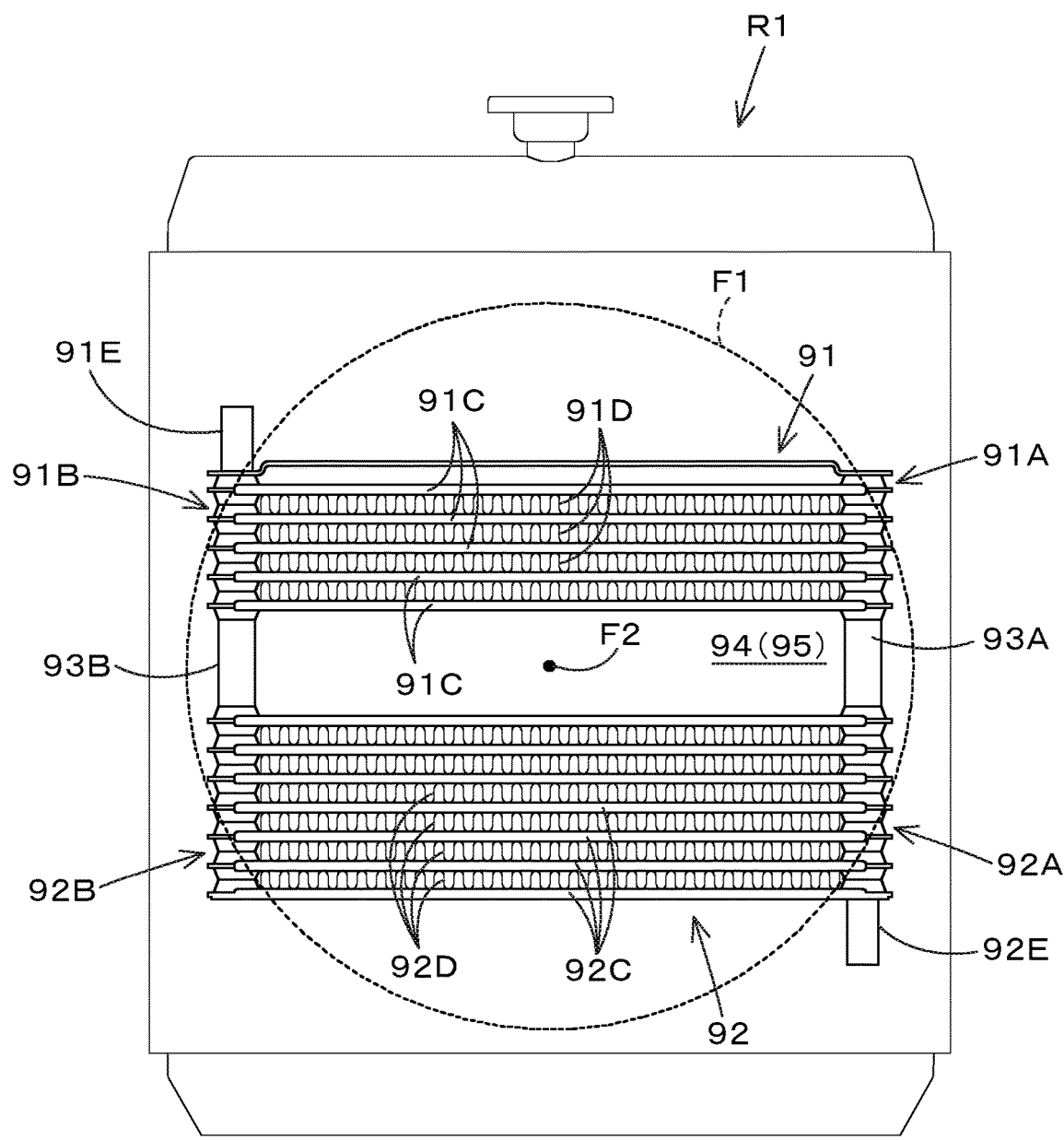
FIG. 16 is a front view of an oil cooler according to another embodiment.

FIG. 16 shows an oil cooler O1 according to another embodiment.

The oil cooler O1 of this embodiment has a first device 91 for fluid-cooling and a second device 92 for fluid-cooling that are disposed so as to be spaced from each other, a first connection tube 93A that connects one end of the first device 91 and one end of the second device 92 to each other, and a second connection tube 93B that connects the other end of the first device 91 and the other end of the second device 92 to each other.

The first device 91 has a pair of first tubular bodies 91A and 91B that are disposed so as to be spaced from each other, a plurality of first tubes 91C that cause the first tubular bodies 91A and 91B to communicate with each other and that are provided so as to be spaced from each other in a longitudinal direction of the first tubular bodies 91A and 91B, and fins 91D that are provided between adjacent ones of the first tubes 91C.

The second device 92 has a pair of second tubular bodies 92A and 92B that are disposed so as to be spaced from each other, a plurality of second tubes 92C that cause the second tubular bodies 92A and 92B to communicate with each other and that are provided so as to be spaced from each other in a longitudinal direction of the second tubular bodies 92A and 92B, and fins 92D that are provided between adjacent ones of the second tubes 92C.

The first connection tube 93A causes the first tubular body 91A and the second tubular body 92A to communicate with each other, and the second connection tube 93B causes the first tubular body 91B and the second tubular body 92B to communicate with each other.

A hydraulic fluid, which is a fluid to be cooled, for example, flows in from any one of the first tubular body 91A, the first tubular body 91B, the second tubular body 92A, and the second tubular body 92B and flows out from any one of the remaining tubular bodies. In the present embodiment, a tubular portion 91E into which (or out of which) a hydraulic fluid flows is provided at the first tubular body 91B, and a tubular portion 92E into which (or out of which) a hydraulic fluid flows is provided at the second tubular body 92A.

An opening portion 94 is formed between the first device 91 and the second device 92 and between the first connection tube 93A and the second connection tube 93B, and is disposed in correspondence with a portion corresponding to a region near the rotation center F2 of the cooling fan F1.

In this other embodiment, by providing the opening portion 94 between the first device 91 and the second device 92, that is, by providing a space where heat is not exchanged in the oil cooler O1, it is possible to suppress an increase in temperature of cooling air that passes through the oil cooler O1. In other words, the opening portion 94 serves as a heat-exchange suppressing portion 95 that suppresses heat exchange between the cooling air 81 and a hydraulic fluid (fluid) that flows in the oil cooler O1. By providing the opening portion 94 (the heat-exchange suppressing portion 95) at the oil cooler O1, it is possible to increase the cooling efficiency of the radiator R1 disposed downstream of the oil cooler O1 in the direction of flow of the cooling air 81.

As shown in FIGS. 11, 12, and 16, the dimension of the oil cooler O1 in an up-down direction is shorter than that of the radiator R1 in the up-down direction. The oil cooler O1 is disposed near the center of the radiator R1 in the up-down direction. Therefore, conventionally, although cooling air 81 having a temperature lower than that of a central portion of the radiator R1 flows at an upper portion and a lower portion of the radiator R1, cooling air 81 having a temperature higher than that of the upper portion and the lower portion of the radiator R1 flows near the center of the radiator R1, as a result of which the vicinity of the center of the radiator R1 becomes hot. In the present embodiment, it is possible to reduce the temperature near the center of the radiator R1 by providing the oil cooler O1 with the heat-exchange suppressing portions 95 that include the non-heat-dissipating portions 88, where the fins 86 are not provided, or with the heat-exchange suppressing portion 95 that has the opening portion 94 provided between the first device 91 and the second device 92.

Although, in the present embodiment, the case in which the oil cooler O1 is provided with at least one heat-exchange suppressing portion 95 is exemplified, it is not limited thereto, and the structure of the oil cooler O1 may be used in another type of cooling device. Examples thereof are the radiator R1 and a condenser for an air-conditioning device (air conditioner). That is, of a plurality of cooling devices disposed in series in a flow passage of the cooling air 81 that is generated by the cooling fan F1, the structure of the oil cooler O1 above can be used in a cooling device that is disposed on an upstream side in the direction of flow of the cooling air 81.

The working machine 1 above includes a travel unit 1A, a working device 4 that is supported at a front portion of the travel unit 1A rotatably around the swing axis X2 extending in an up-down direction, a light 52 that illuminates the vicinity of the travel unit 1A, and a light support mechanism 53 that is provided at the travel unit 1A and that supports the light 52 so that the direction of the light 52 is changeable around a vertical axis (rotation axis X3).

According to this structure, it is possible to change the direction of the light 52 around the vertical axis (the rotation axis X3). Therefore, when the working device 4 is to perform work by being rotated around the swing axis X2, it is possible to change the direction of the light 52 to a required direction.

The travel unit 1A has a traveling device 3, a machine body 2 mounted on the traveling device 3, and a cabin 5 mounted on the machine body 2. The light support mechanism 53 has in the inside of the cabin 5 an operation portion 70 for changing the direction of the light 52.

According to this structure, since the direction of the light 52 can be changed from the inside of the cabin 5, it is possible to change the illumination direction of the light 52 without getting out of the cabin 5.

The light support mechanism 53 has a movable member 57 that rotates together with the light 52 around the vertical axis X3, a support member 58 that is fixed to the cabin 5 and that supports the movable member 57 rotatably around the vertical axis X3 and movably in a direction along the vertical axis X3, and a restriction structural portion 62 that restricts rotation of the movable member 57 with respect to the support member 58. The restriction structural portion 62 allows rotation of the movable member 57 with respect to the support member 58 by moving the movable member 57 in the direction along the vertical axis X3.

According to this structure, it is possible to construct the light support mechanism 53 with a simple structure.

The light support mechanism 53 has an urging member 69 that pushes down the movable member 57. The restriction structural portion 62 has first engaging portions 63 that are provided at the support member 58, and second engaging portions (pins 64) that are provided at the movable member 57 and that restrict rotation of the movable member 57 around the vertical axis X3 by engaging with the first engaging portions 63 from above the first engaging portions 63. The operation portion 70 is attached to the movable member 57 at a location below the restriction structural portion 62.

According to this structure, it is possible to change the direction of the light 52 by gripping the operation portion 70 and pushing up the movable member 57 against an urging force of the urging member 69 and by rotating the movable member 57 around the vertical axis X3. Therefore, it is possible to easily change the direction of the light 52.

The first engaging portions 63 include a plurality of grooves 63 disposed around the vertical axis X3, and the second engaging portions (pins 64) include engaging members (pins 64) that, by being selectively fitted to the plurality of grooves 63, restrict rotation of the movable member 57 with respect to the support member 58. The support member 58 has stoppers 59 that restrict the rotation of the movable member 57 due to the engaging members (pins 64) coming into contact with the stoppers 59 when the movable member 57 rotates with the movable member 57 being pushed up by the support member 58 and the engaging members (pins 64) being separated from the grooves 63.

According to this structure, when the direction of the light 52 is to be changed, an operator can be made to know an end portion of an operation range.

The movable member 57 has a contact member 57B that restricts upward movement of the movable member 57 by coming into contact with the support member 58 so that the engaging members (pins 64) are not positioned above the stoppers 59 when the movable member 57 is pushed up.

According to this structure, when the movable member 57 rotates, it is possible to reliably bring the pins 64 into contact with the stoppers 59.

An interlock portion 79 that changes the direction of the light 52 by moving in conjunction with the rotation of the working device 4 around the swing axis X2 is provided.

According to this structure, an operator need not perform a changing operation on the light 52.

The working machine 1 includes a cooling fan F1, a first cooling device (oil cooler O1) and a second cooling device (radiator R1) that are disposed in series in a flow passage of cooling air 81 that is generated by the cooling fan F1. The first cooling device O1 is disposed upstream of the second cooling device R1 in a direction of flow of the cooling air 81, and has at least one heat-exchange suppressing portion 95 (non-heat-dissipating portions 88, opening portion 94) that is provided at a portion corresponding to a region near the rotation center F2 of the cooling fan F1 and that suppresses heat exchange between the cooling air 81 and a fluid that flows in the first cooling device O1.

According to this structure, it is possible to reduce the temperature of the cooling air 81 that flows to the second cooling device R1 from the first cooling device O1. Therefore, it is possible to increase the cooling efficiency of the cooling device disposed on the downstream side in the direction of flow of the cooling air 81.

The first cooling device O1 has heat-dissipating portions 87 where fins 86 for dissipating heat are provided, and non-heat-dissipating portions 88 where the fins 86 are not provided. The non-heat-dissipating portions 88 serve as heat-exchange suppressing portions 95.

According to this structure, by forming a space where heat exchange is not performed by not providing fins 86, it is possible to reduce the temperature of the cooling air 81 that flows to the second cooling device R1.

The first cooling device O1 has a first tank 82A and a second tank 82B that are disposed in parallel so as to be spaced from each other, and a plurality of tubes 84 that cause the first tank 82A and the second tank 82B to communicate with other and that are provided so as to be spaced from each other in a longitudinal direction of the first tank 82A and the second tank 82B. The first cooling device O1 is configured to cause a fluid that is to be cooled to flow into one of the first tank 82A and the second tank 82B and to flow out of the other of the first tank 82A and the second tank 82B. The heat-dissipating portions 87 include fins 86 between adjacent ones of the tubes 84, and the non-heat-dissipating portions 88 have cooling-air flow passages 89 where the fins 86 are not provided between adjacent ones of the tubes 84.

According to this structure, by not providing the fins 86 in the cooling-air flow passages 89, it is possible to reduce the temperature of the cooling air 81 that flows to the second cooling device R1 via the cooling-air flow passages 89.

The first cooling device O1 has a first device 91 for fluid-cooling and a second device 92 for fluid-cooling disposed so as to be spaced from each other, a first connection tube 93A that connects one end of the first device 91 and one end of the second device 92 to each other, and a second connection tube 93B that connects the other end of the first device 91 and the other end of the second device 92 to each other. The heat-exchange suppressing portion 95 has an opening portion 94 between the first device 91 and the second device 92 and between the first connection tube 93A and the second connection tube 93B.

According to this structure, it is possible to construct a first cooling device having a heat-exchange suppressing portion 95.

The first device 91 has a pair of first tubular bodies 91A and 91B that are disposed so as to be spaced from each other, a plurality of first tubes 91C that cause the first tubular bodies 91A and 91B to communicate with each other and that are provided so as to be spaced from each other in a longitudinal direction of the first tubular bodies 91A and 91B, and fins 91D that are provided between adjacent ones of the first tubes 91C. The second device 92 has a pair of second tubular bodies 92A and 92B that are disposed so as to be spaced from each other, a plurality of second tubes 92C that cause the second tubular bodies 92A and 92B to communicate with each other and that are provided so as to be spaced from each other in a longitudinal direction of the second tubular bodies 92A and 92B, and fins 92D that are provided between adjacent ones of the second tubes 92C. The first connection tube 93A causes the first tubular body 91A and the second tubular body 92A to communicate with each other, and the second connection tube 93B causes the first tubular body 91B and the second tubular body 92B to communicate with each other.

Even this structure makes it possible to construct a first cooling device having a heat-exchange suppressing portion 95.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a cooling fan; and
   a first cooling device and a second cooling device that are disposed in series in a flow passage of cooling air that is generated by the cooling fan,
   wherein the first cooling device is disposed upstream of the second cooling device in a direction of flow of the cooling air, and has a heat-exchange suppressing portion that is provided at a portion corresponding to a region near a rotation center of the cooling fan and that suppresses heat exchange between the cooling air and a fluid that flows in the first cooling device,
   wherein the first cooling device has a first tank and a second tank that are disposed in parallel so as to be spaced from each other, and a plurality of tubes that cause the first tank and the second tank to communicate with each other and that are provided so as to be spaced from each other in a longitudinal direction of the first tank and the second tank, the first cooling device being configured to cause a fluid that is to be cooled to flow into one of the first tank and the second tank and to flow out of the other of the first tank and the second tank, and the first cooling device has a heat-dissipating portion where a fin for heat-dissipation is provided, and a non-heat-dissipating portion where the fin is not provided,
   wherein the heat-dissipating portion includes the fin between adjacent ones of the tubes, and wherein the non-heat-dissipating portion has a cooling-air flow passage where the fin is not provided between adjacent one of the tubes, and the non-heat-dissipating portion serves as the heat-exchange suppressing portion.

2. The working machine according to claim 1,
wherein the first cooling device is disposed such that a central portion of the first cooling device is aligned with a central portion of the cooling fan.

3. The working machine according to claim 2,
wherein, in the first cooling device,
a plurality of the non-heat-dissipating portions are arranged adjacent to each other in the longitudinal direction at the portion corresponding to the region near the rotation center of the cooling fan of the first cooling device, a plurality of the heat-dissipating portions are arranged adjacent to each other in the longitudinal direction and are on one of opposite sides of the plurality of non-heat-dissipating portions in the longitudinal direction, and another plurality of the heat-dissipating portions are arranged adjacent to each other in the longitudinal direction and are on the other of the opposite sides of the plurality of non-heat-dissipating portions in the longitudinal direction.

4. A working machine comprising:
a cooling fan; and
a first cooling device and a second cooling device that are disposed in series in a flow passage of cooling air that is generated by the cooling fan,
wherein the first cooling device is disposed upstream of the second cooling device in a direction of flow of the cooling air, and has a heat-exchange suppressing portion that is provided at a portion corresponding to a region near a rotation center of the cooling fan and that suppresses heat exchange between the cooling air and a fluid that flows in the first cooling device,
wherein the first cooling device has
a first device for fluid-cooling and a second device for fluid-cooling that are disposed so as to be spaced from each other,
a first connection tube that connects one end of the first device and one end of the second device to each other, and
a second connection tube that connects the other end of the first device and the other end of the second device to each other,
wherein the heat-exchange suppressing portion has an opening portion between the first device and the second device and between the first connection tube and the second connection tube.

5. The working machine according to claim 4, wherein the first device has a pair of first tubular bodies that are disposed so as to be spaced from each other, a plurality of first tubes that cause the first tubular bodies to communicate with each other and that are provided so as to be spaced from each other in a longitudinal direction of the first tubular bodies, and a fin that is provided between adjacent ones of the first tubes,
wherein the second device has a pair of second tubular bodies that are disposed so as to be spaced from each other, a plurality of second tubes that cause the second tubular bodies to communicate with each other and that are provided so as to be spaced from each other in a longitudinal direction of the second tubular bodies, and a fin that is provided between adjacent ones of the second tubes,
wherein the first connection tube causes one of the first tubular bodies and one of the second tubular bodies to communicate with each other, and
wherein the second connection tube causes the other of the first tubular bodies and the other of the second tubular bodies to communicate with each other.

* * * * *